(12) United States Patent
Fein et al.

(10) Patent No.: US 7,525,210 B2
(45) Date of Patent: Apr. 28, 2009

(54) SYSTEM AND METHOD FOR CREATING A NETWORKED INFRASTRUCTURE DISTRIBUTION PLATFORM OF FIXED AND MOBILE SOLAR AND WIND GATHERING DEVICES

(75) Inventors: Gene S. Fein, Lenox, MA (US); Edward Merritt, Lenox, MA (US)

(73) Assignee: Genedics LLC, Lenox, MA (US)

( * ) Notice: Subject to any disclaimer, the term of this patent is extended or adjusted under 35 U.S.C. 154(b) by 58 days.

(21) Appl. No.: 11/645,109

(22) Filed: Dec. 22, 2006

(65) Prior Publication Data

US 2008/0149403 A1    Jun. 26, 2008

(51) Int. Cl.
*F03D 9/00* (2006.01)
*F02D 20/12* (2006.01)

(52) U.S. Cl. ............................ 290/44; 290/55; 415/4.3; 180/165

(58) Field of Classification Search ................ 290/1 R, 290/43, 44, 54, 55; 415/4.3; 180/165
See application file for complete search history.

(56) References Cited

U.S. PATENT DOCUMENTS

| | | | |
|---|---|---|---|
| 3,971,454 A | 7/1976 | Waterbury | |
| 3,982,527 A | 9/1976 | Cheng et al. | |
| 4,117,900 A | 10/1978 | Amick | |
| 4,119,863 A | 10/1978 | Kelly | |
| 4,182,960 A | 1/1980 | Reuyl | |
| 4,249,083 A | 2/1981 | Bitterly | |
| 4,314,160 A * | 2/1982 | Boodman et al. | 290/55 |
| RE31,156 E | 2/1983 | Dessert | |
| 4,440,150 A | 4/1984 | Kaehler | |
| 4,592,136 A | 6/1986 | Hirsch | |
| 4,797,566 A | 1/1989 | Nozaki et al. | |

(Continued)

FOREIGN PATENT DOCUMENTS

WO    WO 2006/121414 A    11/2006

(Continued)

OTHER PUBLICATIONS

Holmes, Andrew S., et al., "Axial-Flux Permanent Magnet Machines for Micropower Generation," Journal of Microelectrical Systems, vol. 14, No. 1, Feb. 2005.

(Continued)

*Primary Examiner*—Nicholas Ponomarenko
(74) *Attorney, Agent, or Firm*—Hamilton, Brook, Smith & Reynolds, P.C.

(57) ABSTRACT

A roadway system for energy generation and distribution is presented. In accordance with one embodiment of the invention, the roadway system comprises a plurality of ground-based wind energy generating devices, one or more roads, and a roadway system electricity grid. The roadway system may additionally include, for example, a plurality of ground-based solar energy generating devices, one or more vehicle-based solar energy generating devices and one or more vehicle-based wind energy generating devices. The energy generating devices are connected to the roadway system electricity grid and substantially all of the ground-based wind energy generating devices are positioned on part of one of the roads or near to one or more of the roads to thereby allow energy generation from wind created from passing vehicles in addition to energy generation from atmospheric wind.

46 Claims, 33 Drawing Sheets

U.S. PATENT DOCUMENTS

| | | | |
|---|---|---|---|
| 5,075,564 A * | 12/1991 | Hickey | 290/55 |
| 5,254,876 A | 10/1993 | Hickey | |
| 5,272,378 A * | 12/1993 | Wither | 290/1 R |
| 5,296,746 A | 3/1994 | Burkhardt | |
| 5,606,233 A * | 2/1997 | Davis | 318/142 |
| 5,787,878 A | 8/1998 | Ratliff, Jr. | |
| 5,852,353 A | 12/1998 | Kochanneck | |
| 5,920,127 A | 7/1999 | Damron et al. | |
| 6,409,467 B1 * | 6/2002 | Gutterman | 415/4.3 |
| 6,624,530 B1 | 9/2003 | Toulon | |
| 6,630,622 B2 | 10/2003 | Konold | |
| 6,688,303 B2 | 2/2004 | Davenport et al. | |
| 6,809,432 B1 * | 10/2004 | Bilgen | 290/55 |
| 6,882,059 B1 | 4/2005 | DePaoli | |
| 6,897,575 B1 * | 5/2005 | Yu | 290/44 |
| 6,959,993 B2 * | 11/2005 | Gross et al. | 359/853 |
| 6,981,377 B2 | 1/2006 | Vaynberg et al. | |
| 7,012,188 B2 | 3/2006 | Erling | |
| 7,098,553 B2 * | 8/2006 | Wiegel et al. | 290/55 |
| 7,127,328 B2 | 10/2006 | Ransom | |
| 7,192,146 B2 * | 3/2007 | Gross et al. | 359/853 |
| 7,193,332 B2 * | 3/2007 | Spinelli | 290/1 R |
| 7,339,286 B1 | 3/2008 | Chen | |
| 7,434,636 B2 | 10/2008 | Sutherland | |
| 7,453,164 B2 | 11/2008 | Borden et al. | |
| 2004/0113291 A1 | 6/2004 | Klausner et al. | |
| 2005/0230238 A1 | 10/2005 | Klausner et al. | |
| 2006/0113118 A1 | 6/2006 | Kim | |
| 2006/0137348 A1 | 6/2006 | Pas | |
| 2007/0284885 A1 | 12/2007 | Menges | |
| 2008/0054638 A1 | 3/2008 | Greene et al. | |
| 2008/0148549 A1 | 6/2008 | Fein et al. | |
| 2008/0148732 A1 * | 6/2008 | Fein et al. | 60/641.3 |
| 2008/0148733 A1 * | 6/2008 | Fein et al. | 60/641.7 |
| 2008/0149302 A1 | 6/2008 | Fein et al. | |
| 2008/0149573 A1 | 6/2008 | Fein et al. | |
| 2008/0150284 A1 * | 6/2008 | Fein et al. | 290/44 |
| 2008/0150286 A1 * | 6/2008 | Fein et al. | 290/44 |
| 2008/0150288 A1 * | 6/2008 | Fein et al. | 290/55 |
| 2008/0150289 A1 * | 6/2008 | Fein et al. | 290/55 |
| 2008/0150290 A1 * | 6/2008 | Fein et al. | 290/55 |
| 2008/0150291 A1 | 6/2008 | Fein et al. | |
| 2008/0150295 A1 * | 6/2008 | Fein et al. | 290/1 R |
| 2008/0150296 A1 * | 6/2008 | Fein et al. | 290/1 R |
| 2008/0150298 A1 | 6/2008 | Fein et al. | |
| 2008/0152492 A1 | 6/2008 | Fein et al. | |
| 2008/0154800 A1 | 6/2008 | Fein et al. | |
| 2008/0154801 A1 * | 6/2008 | Fein et al. | 705/412 |
| 2008/0163919 A1 | 7/2008 | Fein et al. | |
| 2008/0196758 A1 | 8/2008 | McGuire | |

FOREIGN PATENT DOCUMENTS

| | | |
|---|---|---|
| WO | WO 2006/138516 A | 12/2006 |
| WO | WO 2008/079369 | 7/2008 |
| WO | WO 2008/115479 A2 | 9/2008 |
| WO | WO 2008/118321 A2 | 10/2008 |
| WO | WO 2008/133872 A2 | 11/2008 |
| WO | WO 2008/136901 A2 | 11/2008 |

OTHER PUBLICATIONS

Zhong Lin Wang and Jinhui Song, "Piezoelectric Nanogenerators Based on Zinc Oxide Nanowire Arrays," Science, vol. 312, Apr. 14, 2006.

www.metropolismag.com, 6 pages, retrieved from Internet Apr. 19, 2007.

www.greencarcongress.com, 4 pages, retrieved from Internet Apr. 19, 2007.

www.panasonic.co.jp, 8 pages, retrieved from Internet Jan. 26, 2007.

Bourouni, K., et al., Experimentation and Modelling of an Innovative Geothermal Desalination Unit, *Desalination 125*, pp. 147-153 (Nov. 9-12, 1999).

Tzen, E., et al., "Renewable Energy Sources for Desalination," *Solar Energy* 75(5), pp. 375-379 (Nov. 1, 2003).

Garcia-Rodriguez, L., "Seawater Desalination Driven by Renewable Energies: A Review," *Desalination* 143(2), pp. 103-113 (May 20, 2002).

Kalogirou, S.A., "Seawater-Desalination Using Renewable Energy Sources," *Progress in Energy and Combustion Science* 31(3), pp. 242-281 (Jan. 1, 2005).

Belessiotis, V., et al., "The History of Renewable Energies for Water Desalination," *Desalination* 128, pp. 147-159 (2000).

Awerbuch, L., et al., "Geothermal Energy Recovery Process," *Desalination* 19, pp. 325-336 (1976).

International Search Report for PCT/us2008/006034, date of mailing Oct. 24, 2008.

International Search Report for PCT/US2008/003603, date of mailing Oct. 31, 2008.

* cited by examiner

SYSTEM AND METHOD FOR CREATING A NETWORKED INFRASTRUCTURE DISTRIBUTION PLATFORM OF FIXED AND MOBILE SOLAR AND WIND GATHERING DEVICES

BACKGROUND OF THE INVENTION

It is well known that solar power is derived by photovoltaic systems, solar panels made from silicon and other materials and thin film solar deployments. Solar power installations where one or more of these solar power gathering unit devices are tied together are referred to as 'arrays'; are a method of generating clean energy that is used throughout the globe. Solar power generation, as mentioned previously, can come from thin film solar applications, panelized silicon crystal applications and also from passive solar design schemes and many other sources. The cost of solar power gathering systems has gone down in recent years while the efficiency of such systems has continued to improve. It is also well known that wind power turbines can generate power that can be delivered via interconnection to existing grid systems or can be used to power individual homes, businesses and utilities. Most, if not all wind power systems that are used to gather large amounts, in the MegaWatt range of power are large structure wind turbines many of which are at least 100 feet high. In the past, small wind powered turbines have also been placed high up from the ground usually at least 15 feet high. Also, most small wind power turbine systems are utilized to power a single home, business or elements of that home or business Currently, solar power creates under 10% of the energy market share in the United States. Isolated uses of solar power are effective, but there incremental installation does not create a convenient solar infrastructure. For wind power systems large wind installations in order of 100 foot or more sized turbines dot the landscape of the planet. These turbines are often positioned in remote fields out to sea or on private property away from public infrastructure. Small wind installations of turbines and other gathering devices in the 5 to 30 foot range are typically utilized in three deployments. The first deployment features clusters of small to mid sized turbines set up in remote windy areas such as the desert environment near Palm Desert in California. The second deployment features isolated powering of small homes and businesses such as those in remote artic or extreme cold climates where heating and cooling infrastructure does not exist, or is augmented at the micro use level for one home or business by small wind turbine implementation. The third deployment model features isolated powering of entities for government utilities such as isolated powering of single light stands at the Hanauma Bay National Park public parking lot in Oahu Hawaii. As of now, there are no known models for gathering wind power that may be reclaimed from moving vehicles. Projects for the reclamation of carbon and heat from water pipes and the like are under way commercially.

Conventional models have solar power being used to power individual homes and businesses via installations on those homes and businesses. Solar power plants are becoming more popular and new isolated site power plants are being developed in places like Korea where GE is supplying panels for a new 3 megawatt facility project in Yong Gwang. Isolated solar panels are also in use on roadways to light signs, lights and power emergency telephones and telephone boxes. Conventional models for vehicles have vehicles outfitted with solar panels being used to power those same vehicles exclusively. Conventional wind models address power plant and isolated use models for the generation and distribution of wind power. Large turbines generate Megawatt volumes of power to be utilized locally or interconnected back to the grid system. Small wind generation systems are typically used to solve local power issues, such as street lights or home or business power needs as well as having the ability to be interconnected to a grid system for the purpose of selling the power generated by the wind gathering system to a public or private utility. Small solar and small wind deployments could be currently utilized on vehicles on a case by case basis based upon the vehicle owner purchasing and installing the available equipment installed on an isolated vehicle by vehicle basis.

Unfortunately, the lack of cohesive solar and wind gathering and distribution resources have limited solar and wind power to a single digit market shares of the overall energy use in the United States. The ideas of powering individual homes and businesses, while very effective, constitute incremental gains in the distribution and use of solar power. The same can be said for privately funded solar power plants because many of them must be built in remote, sunny, desert like locations far from easy access to the grid or direct power access to homes or businesses. Solar vehicles have been focused in a single priority to make vehicles run from the solar power that they are gathering, either solely, or via the use of a hybrid power system that combines other energy sources to power the vehicle. Wind powered existing conventional uses have certain limitations in distribution and deployment. Large turbines have faced environmental and Defense Department concerns. Environmentalists fear that the noise and size of turbines will disrupt both scenic and habitat conditions in addition to threatening the well being of birds that may be caught in the large turbine blades. Department of Defense concerns have been raised over the large turbines interfering with radar signals and tracking. Large turbine systems that are placed far away from existing infrastructure also incur a large expense in the transportation or building of infrastructure to carry the power generated by the turbine system. Finally, the large turbine system represents a large investment for a single turbine that is a volatile investment in that if the wind is not present or wind currents change then the turbine would be viewed as a poor investment because it will not generate enough power. Also, if the turbine breaks for any reason it is going to produce zero power as it is a large and single entity. Large turbines also require labor intensive maintenance and monitoring. The life cycle for large wind turbines is 20 years and decommissioning and waste generated by manufacture, installation and decommissioning is another environmental issue to contend with. Small wind power utilized in isolated areas and for private homes, businesses and individual is a great way to introduce clean energy on a unit by unit grass roots level. The issue with isolated uses which the instant invention addresses is that isolated uses are isolated by definition. Isolated uses do not carry out the ability to directly power businesses or residential sites over a long stretch of land covering tens, hundreds, thousands or hundreds of thousands of miles providing easy access to direct powering of entities as well as multiple grid interconnection points. Current models also require each individual vehicle owner to make an individual investment in wind power or solar power gathering devices in order to be able to install and generate power from such devices. This is a major impediment toward being able to create a large fleet of vehicles gathering energy from small wind and solar gathering mechanisms or devices. Another impediment is that the power generated from such systems requires a second device or hardware system in order to utilize, receive credit for energy gathered and economically benefit from the power that is derived by the wind and/or solar gathering system.

SUMMARY OF THE INVENTION

The present invention provides a solution to the problems of the prior art.

One embodiment of the present invention is a roadway system for energy generation and distribution. This roadway system includes a plurality of ground-based wind energy generating devices; one or more roads; and a roadway system electricity grid. In this roadway system, each of substantially all of the ground-based wind energy generating devices is electrically connected to the roadway system electricity grid and positioned on part of one of the roads or near to one or more of the roads to thereby allow energy generation from wind created from passing vehicles in addition to energy generation from atmospheric wind.

A related embodiment of the present invention is a roadway system that includes a plurality of ground-based solar energy generating devices; one or more roads; and a roadway system electricity grid. In this roadway system, each of substantially all of the ground-based solar energy generating devices, independently, is electrically connected to the roadway system electricity grid and positioned on part of one of the roads or near to one or more of the roads.

Another embodiment of the present invention is roadway system for energy generation and distribution that includes a plurality of ground-based wind energy generating devices; a plurality of ground-based solar energy generating devices; one or more roads; and a roadway system electricity grid. In this roadway system, each of substantially all of the ground-based wind energy generating devices is electrically connected to the roadway system electricity grid and positioned on part of one of the roads or near to one or more of the roads to thereby allow energy generation from wind created from passing vehicles in addition to energy generation from atmospheric wind, and each of substantially all of the ground-based solar energy generating devices is electrically connected to the roadway system electricity grid and positioned on part of one of the roads or near to one or more of the roads.

Another embodiment of the present invention is roadway system for energy generation and distribution that includes a plurality of ground-based wind energy generating devices; a plurality of ground-based solar energy generating devices; one or more vehicles, each comprising one or more vehicle-based solar energy generating devices; and a vehicle-based energy storage system; one or more roads; and a roadway system electricity grid. In this roadway system, each of substantially all of the ground-based wind energy generating devices is electrically connected to the roadway system electricity grid and positioned on part of one of the roads or near to one or more of the roads to thereby allow energy generation from wind created from passing vehicles in addition to energy generation from atmospheric wind, each of substantially all of the ground-based solar energy generating devices is electrically connected to the roadway system electricity grid and positioned on part of one of the roads or near to one or more of the roads, and the one or more vehicle-based solar energy generating devices are electrically connected to the vehicle-based energy storage system to thereby allow deposition of energy generated by the one or more vehicle-based solar energy generating devices into the vehicle-based energy storage system.

Another embodiment of the present invention is a roadway system for energy generation and distribution that includes a plurality of ground-based wind energy generating devices; a plurality of ground-based solar energy generating devices; one or more vehicles, each comprising one or more vehicle-based wind energy generating devices; and a vehicle-based energy storage system; one or more roads; and a roadway system electricity grid; wherein each of substantially all of the ground-based wind energy generating devices is electrically connected to the roadway system electricity grid and positioned on part of one of the roads or near to one or more of the roads to thereby allow energy generation from wind created from passing vehicles in addition to energy generation from atmospheric wind, each of substantially all of the ground-based solar energy generating devices is electrically connected to the roadway system electricity grid and positioned on part of one of the roads or near to one or more of the roads, and for a given vehicle the respective one or more vehicle-based wind energy generating devices are electrically connected to the vehicle-based energy storage system of the given vehicle to thereby allow deposition of energy generated by the one or more vehicle-based wind energy generating devices into the vehicle-based energy storage system.

Another embodiment is a roadway system for energy generation and distribution that includes a plurality of ground-based wind energy generating devices; a plurality of ground-based solar energy generating devices; one or more vehicles, each comprising one or more vehicle-based wind energy generating devices and one or more vehicle-based solar energy generating devices; and a vehicle-based energy storage system; one or more roads; and a roadway system electricity grid. In this roadway system, each of substantially all of the ground-based wind energy generating devices is electrically connected to the roadway system electricity grid and positioned on part of one of the roads or near to one or more of the roads to thereby allow energy generation from wind created from passing vehicles in addition to energy generation from atmospheric wind, each of substantially all of the ground-based solar energy generating devices is electrically connected to the roadway system electricity grid and positioned on part of one of the roads or near to one or more of the roads, and for a given vehicle the respective one or more vehicle-based wind energy generating devices and respective one or more vehicle-based solar energy generating devices are electrically connected to the vehicle-based energy storage system for the given vehicle to thereby allow deposition of energy generated by the one or more vehicle-based wind energy generating devices and one or more vehicle-based solar energy generating devices into the vehicle-based energy storage system.

Another embodiment of the present invention is a roadway system for energy generation and distribution that includes a plurality of ground-based wind energy generating devices; one or more roads; and a roadway system electricity grid. In this roadway system, each of substantially all of the ground-based wind energy generating devices is electrically connected to the roadway system electricity grid and positioned on a median of one of the roads or within about 25 feet from one or more of the roads to thereby allow energy generation from wind created from passing vehicles in addition to energy generation from atmospheric wind, and at least 90% (by number) of the plurality of ground-based wind energy generating devices is equal to or less than about 10 feet in height.

Another embodiment of the present invention is a method for generating and distributing energy. This method includes the step of generating energy from wind created from passing vehicles using a plurality of ground-based wind energy generation devices, wherein each of substantially all of the ground-based wind energy generating devices is electrically connected to a roadway system electricity grid and positioned on part of a road or near to one or more roads.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE INVENTION

Figure 1:
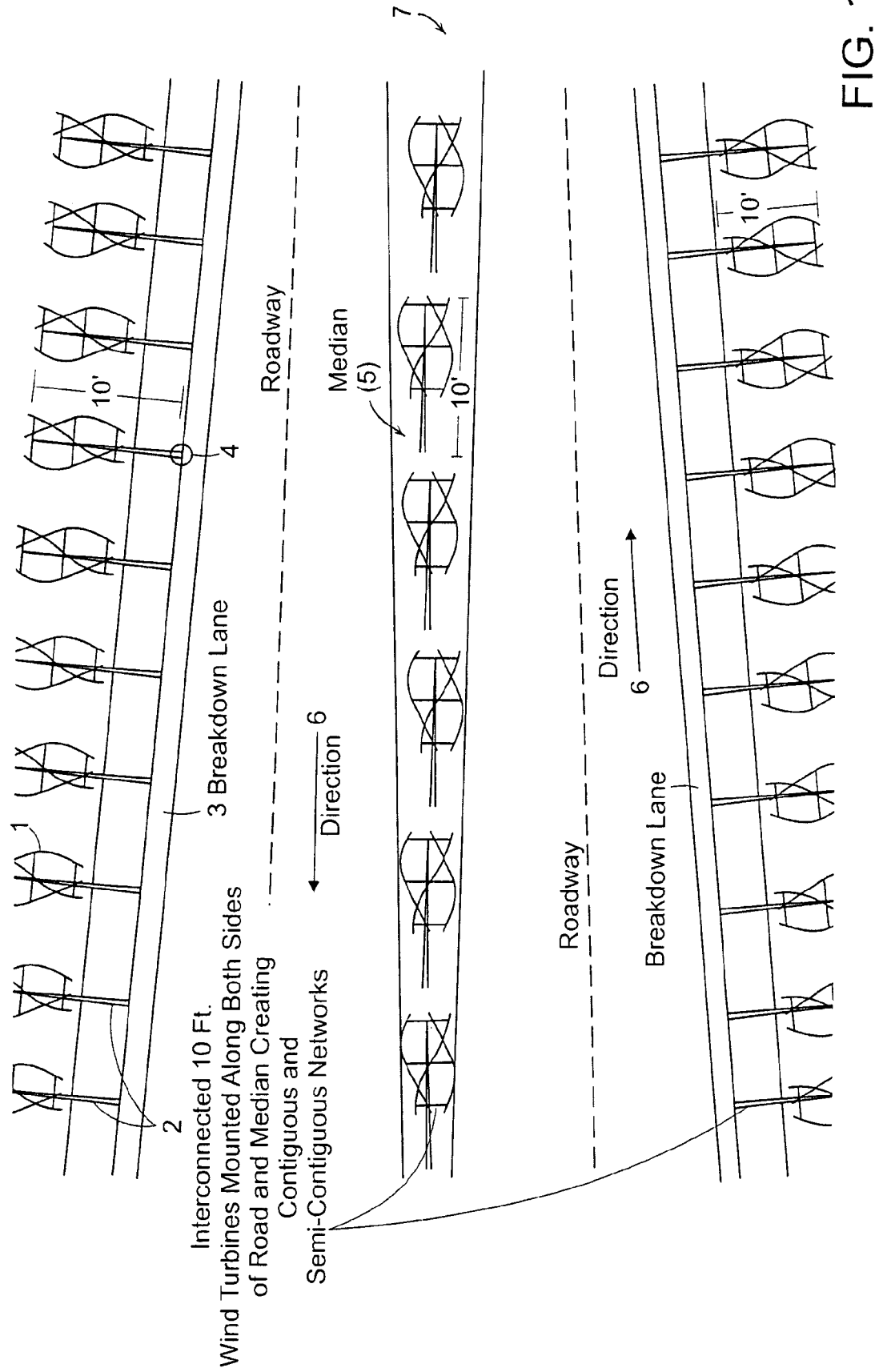
FIG. 1 illustrates the implementation of the small, fixed wind turbine arrays along the roadway.

The present invention provides a roadway system that can provide the basis for a national or global clean or renewable energy infrastructure.

A "road" (hereinafter also "roadway") as used herein, is an identifiable route or path between two or more places on which vehicles can drive. A road is typically smoothed, paved, or otherwise prepared to allow easy travel by the vehicles. Also, typically, a road may include one or more lanes, one or more breakdown lanes, one or more medians or center dividers, and one or more guardrails. For example, a road may be highway, turnpike, pike, toll road, state highway, freeway, clearway, expressway, parkway, causeway, throughway, interstate, speedway, autobahn, superhighway, street, railroad, train track, car race tack airplane runway and the like.

A "vehicle" as used herein, is any device that is used at least partly for ground-based transportation, for example, of goods and/or humans. For example, a vehicle may be an automobile, a car, a bus, a truck, a tractor, a tank, a motorcycle, a train, an airplane or the like.

Preferably, a vehicle can be an automobile, a car, a bus, a truck, a tank, and a motorcycle. More preferably, a vehicle can be an automobile, a car, a bus, and a truck. Most preferably, a vehicle can be an automobile and a car. "Wind" as used herein refers to both, wind created by the movement of vehicles (hereinafter also "dirty wind") and atmospheric wind.

A "wind energy generating device" as used herein, is a device that converts wind energy into electrical energy. Typically, a wind energy generating device can include one or more "wind turbine generators." A "wind turbine generator" (hereinafter also "wind turbine") as referred to herein, is a device that includes a turbine and a generator, wherein the turbine gathers or captures wind by conversion of some of the wind energy into rotational energy of the turbine, and the generator generates electrical energy from the rotational energy of the turbine. These wind turbine generators can employ a turbine rotating around an axis oriented in any direction. For example, in a "horizontal axis turbine," the turbine rotates around a horizontal axis, which is oriented, typically, more or less parallel to the ground. Furthermore, in a "vertical axis turbine," the turbine rotates around a vertical axis, which is oriented, typically, more or less perpendicular to the ground. For example, a vertical axis turbine can be a Darrieus wind turbine, a Giromill-type Darrieus wind turbine, a Savonius wind turbine, a "helix-style turbine" and the like. In a "helix style turbine," the turbine is helically shaped and rotates around a vertical axis. A Helix-style turbine can have a single-helix design or multi-helix design, for example, double-helix, triple-helix or quad-helix design. The "height" of a wind energy generating device or wind turbine generator as used herein, is the height measured perpendicularly from the ground adjacent to the device or generator to the highest point of the device or generator. Wind energy generating devices can have a height between about a few micrometers and several hundred feet. wind energy generating devices that employ a plurality, for example, up to millions of small wind turbine generators in one device unit are also referred to herein as "wind turbine installation sheets", and "wind turbine installation placards." Wind energy generation devices can be spatially positioned in any pattern or distribution that conforms with safety and other regulations. Generally the distribution can be optimized in view of the given road and road environment. For example, they can be positioned in a linear equidistant distribution, a linear non-equidistant distribution and a stratum configuration. Wind energy generating devices can optionally include solar energy generating devices as described below.

A "stratum configuration" as used herein, is a distribution of wind energy generating devices, in which wind energy generation devices that are further away from the nearest lane of a road, are higher. For example, a stratum configuration of wind energy generating devices results from positioning the smallest wind energy generation devices nearest to a road and successively larger wind energy generation devices successively further from the road.

Typically, the average distance between any two closest ground-based wind energy generating devices is in the range between about 5 micrometer and about 200 meters.

Wind energy generating devices can be "vehicle-based," that is, they are affixed to any part of the surface of a vehicle that allows normal and safe operation of the vehicle. Vehicle-based wind energy generating devices can be permanently affixed or mounted to the car, for example, during the vehicle manufacturing process or overlay bracing, or they can be removable affixed using, for example, one or a combination of snap on clips, adhesive magnetic bonding, a locking screw mounting system, Thule-type locking and the like. A vehicle and a vehicle-based wind energy generating device can also include directional spoilers or wings that are positioned to thereby decrease air resistance of a moving vehicle and increase wind energy generation. A vehicle and a vehicle-based wind energy generating device can also include a device for measuring the direction of the atmospheric wind at or near the positions of one or more vehicle-based wind energy generating devices and movable directional spoilers or wings that are moved based on the measured wind direction information to thereby decrease air resistance of a moving vehicle and increase wind energy generation. Vehicle-based wind energy generating devices can generate energy while a vehicle is parked or moving. Typically, vehicle-based wind energy generating devices have a height of between about a few micrometers and about a few feet.

Any wind energy generating device that is not affixed to a vehicle is hereinafter referred to as "ground-based." Typically, a ground-based wind energy generating device can be positioned on part of a road on which its presence does not hinder the flow of traffic or pose a safety risk, near to a road, and on any road object on or near to a road. Examples of road objects are traffic signs, for example, traffic lights, guardrails, buildings and the like. Ground-based wind energy generating devices can be permanently affixed or mounted into the ground multiples of feet deep and sometimes set into a foundation, or they can be affixed such that they are easily removed using, for example, one or a combination of snap on clips, adhesive magnetic bonding, a locking screw mounting system, magnets, braces and ties to metal structures, Thule-type locking and the like.

The phrase "near" a road as used herein, refers to the distance of a given ground-based wind energy generating device from a given road that allows the ground-based wind energy generating device to capture wind from passing vehicles (hereinafter also "dirty wind") to generate energy. This distance can be determined in view of the height of the turbine and the average velocity of an average vehicle passing the wind energy generating device. Typically, this distance can be up to about 40 feet. For example, for a helical axis turbine of 10 feet height, positioned along a road on which vehicle travel with an average velocity of 55 miles per hour, the distance can be up to about 20 feet and for one of 5 feet height, the distance can be up to about 25 feet.

A "wind turbine array" as used herein is a plurality of wind energy generating devices.

An "roadway system electricity grid" as used herein, refers to any network of electrical connections that allows electrical energy to be transported or transmitted. Typically, a roadway system electricity grid can include energy storage systems, systems for inverting energy, single power source changing units, electricity meters and backup power systems.

A "utility grid" (hereinafter also "grid") as used herein, refers to the existing electrical lines and power boxes, such as Edison and NStar systems.

A "direct power load" is any system, that is directly electrically connected to the roadway system electricity grid, that is, without electrical energy being transmitted via a utility grid, and has a demand for electrical energy, for examples, any business or home.

An "energy storage system" as used herein is any device that can store electrical energy. Typically, these systems transform the electrical energy that is to be stored in some other form of energy, for example, chemical and thermal. For example, an energy storage system can be a system that stores hydrogen, which for example, is obtained via hydrogen conversion electrolysis. It can also be any rechargeable battery. "Ground-based energy storage systems" can be positioned below or above the ground. "Vehicle-based energy storage systems" can be permanently affixed or mounted in or on the car, for example, during the vehicle manufacturing process, or they can be removable affixed using, for example, one or a combination of snap on clips, adhesive magnetic bonding, a locking screw mounting system, Thule-type locking and the like.

The phrase "connected to the roadway system electricity grid" as used herein, refers to any direct or indirect electrical connection of a solar or wind energy generating device to the roadway system electricity grid that allows energy to be transferred from the energy generating device to the grid.

A "solar energy generating device" as used herein, is any device that converts solar energy into electricity. For example, a solar energy generating device can be a single solar or photovoltaic cell, a plurality of interconnected solar cells, that is, a "photovoltaic module", or a linked collection of photovoltaic modules, that is, a "photovoltaic array" or "solar panel." A "solar or photovoltaic cell" (hereinafter also "photovoltaic material") as used herein, is a device or a bank of devices that use the photovoltaic effect to generate electricity directly from sunlight. For example, a solar or photovoltaic cell can be a silicon wafer solar cell, a thin-film solar cell employing materials such as amorphous silicon, poly-crystalline silicon, micro-crystalline silicon, cadmium telluride, or copper indium selenide/sulfide, photoelectrochemical cells, nanocrystal solar cells and polymer or plastic solar cells. Plastic solar cells are known in the art to be paintable, sprayable or printable roll-to-roll like newspapers.

A "solar energy generating device" can be ground-based or vehicle based. A vehicle-based solar energy generating device can be permanently affixed or mounted to the car, for example, during the vehicle manufacturing process or overlay bracing, or they can be removable affixed using, for example, one or a combination of snap on clips, adhesive magnetic bonding, a locking screw mounting system, Thule-type locking and the like.

A ground-based solar energy generating device can be attached to any surface that allows collection of solar energy and where its installation does not pose a safety risk or is not permitted by regulations. For example, it can be positioned on part of a road on which its presence does not hinder the flow of traffic or pose a safety risk, near to a road, and on any road object on or near to a road. Examples of road objects are traffic signs, for example, traffic lights, guardrails, buildings and the like. Ground-based wind energy generating devices can be permanently affixed or mounted into the ground multiples of feet deep and sometimes set into a foundation, or they can be affixed such that they are easily removed using, for example, one or a combination of snap on clips, adhesive magnetic bonding, a locking screw mounting system, magnets, braces and ties to metal structures, Thule-type locking and the like.

A description of example embodiments of the invention follows.

One embodiment of the present provides lines of wind turbines and solar power arrays running along and in the median of major roadways and highways combined with the gathering and distribution of power resulting from vehicle installations of wind and solar energy gathering devices installed permanently or temporarily, for free or for pay, with or without deposit, in use with existing highway systems like FastLane or run as a completely independent program for affixing solar and wind power gathering devices on vehicles to create a widespread portable solar energy gathering network of vehicles. Vehicles can be affixed with 'vehicle arrays' on or adjacent to major roadways and highways potentially creating a solar power gathering network infrastructure of hundreds of thousands of miles long, augmented by millions of vehicles installed with solar arrays designed for vehicles for the purpose of gathering solar power enabling vehicle owners to take advantage of the solar network energy gathering and distribution system to be easily equipped and compensated and for their participation via power gathered by their vehicle system, most of both sets, vehicle and line, of solar arrays will be convenient to the grid and to powering individual homes, public infrastructure and businesses. The present invention also carries with it the potential to move solar power into the double digit overall energy market share in the United States. Additionally, there is a need for an integrated small wind power infrastructure that is easily connected to multiple direct sources or various grid interconnection points. The use of public and private highways via median and outside of breakdown lane installations of small wind generating devices offers numerous advantages. First, private highways and municipalities have existing maintenance crew as well as existing relationships with contracted infrastructure building providers who can be trained to install the wind generation systems along specified parts of roadways. Second, the wind power generation systems can be small and noiseless, small enough to fit on a median between opposite sides of a divided highway with existing median. Third, using a highway or other roadway allows for the installation of many wind generating devices per mile with over 500 wind generating devices possible per mile. Fourth, the energy generated by the devices may be distributed directly to homes or businesses along the highway route, such as powering homes or clean power for the electrolysis of hydrogen for filling stations along a highway, either utilizing hydrogen conversion at individual filling stations or at a conveniently located hydrogen conversion plant adjacent to the highway or roadway. Fifth, other clean energy sources such as solar, geothermal and other heat conversion technologies may be used to create a multi-source clean energy 'power grid' along with or in tandem with the 'grid' in place via potential for the connection of miles of wind power gathering, storage and transfer of generated power. Sixth, these infrastructures benefit the wind power generator companies; the roadway owners via lease or easement revenue, provide a stable and consistent infrastructure project generating a service provider economy for clean energy production as well as the environment. Seventh, roadways are a consistent source of wind and by having small wind energy capture generating devices close to the ground the wind energy capture devices, such as small noiseless spiral or helix-style turbines, enable the devices to capture wind energy generated by passing vehicles as well as existing currents. Eighth, the power generated by this system may also be connected to a grid system at many different and convenient points located very close to the existing grid infrastructure. This fixed system can be utilized in tandem and complimentary ways to deploy installations, maintenance, billing and depositing of gathered power with the present vehicle system, and solar systems allowing for portable, semi-permanent or permanent wind small wind turbines to be affixed to vehicles at or near the point of entry to major roadways and highways. Vehicle owners may pay little or no charge to have the wind turbine device or devices installed on their vehicles. Deposits from vehicle owners securing the safe return of the wind turbine energy generating system device may be secured through participating vehicle owner's financial institutions or via cash deposit. Participating vehicle owners, turbine installers, roadway owners or municipalities in control of the roadways and the owners of the turbines that are installed may all receive a share of the revenue from energy generated, stored and transferred into the grid or via direct distribution by the system after energy is generated by the individual vehicles and that electricity is off-loaded at designated, easily accessible, vehicle wind system network electricity collection stations or substations. This model creates a situation where drivers of vehicles do not have to spend significant time or financial resources to begin generating wind energy with their vehicles. This model creates a friendly format for wide-scale distribution of wind energy generating devices for thousands of miles of installations on roadways and millions of installations deployed on vehicles to take advantage of. By combining solar and wind power systems within this infrastructure and distribution plan the creation of a complimentary clean energy distribution network is achieved because both wind and solar power systems gather energy under different conditions. By having two gathering systems, if one method is not efficient at a particular time, then the other method may still have conditions that are effective for it to gather energy at that time. Thus the deployment of both sources of energy gathering systems, wind and solar, along this massive infrastructure of roadways enhances the ability to provide a more constant and stable clean power infrastructure.

One embodiment of the invention is a roadway system for energy generation and distribution, comprising: a plurality of ground-based wind energy generating devices; one or more roads; and a roadway system electricity grid; wherein each of substantially all of the ground-based wind energy generating devices is electrically connected to the roadway system electricity grid and positioned on part of one of the roads or near to one or more of the roads to thereby allow energy generation from wind created from passing vehicles in addition to energy generation from atmospheric wind.

Typically, each of substantially all of the ground-based wind energy generating devices can be positioned on part of one of the roads or within between about 0 feet and about 100 feet, within between about 0 feet and about 80 feet, or within between about 0 feet and about 60 feet from one or more of the roads. More typically, they can be on part of one of the roads or within between about 0 feet and about 40 feet from one or more of the roads. Preferably, they can be on part of one of the roads or within between about 0 feet and about 25 feet from one or more of the roads. More preferably, they can be on part of one of the roads or within between about 0 feet and about 10 feet from one or more of the roads The present invention relates to a contiguous or semi contiguous line of interconnected solar panels or thin films combined with a network of wind turbines running for thousands of total miles along public or private roadways. Deployments of energy gathering systems will be both fixed stationary systems as well as mobile systems mounted on vehicles traveling the roadways & highways. By running the solar power gathering network on or adjacent to highways or trafficked roadways the solar power gathering network will have easy access to both grid interconnection and local powering of public and private entities. New advances in solar energy gathering techniques allow for this kind of power gathering line system to be deployed in a more flexible, multi-form and cost efficient manner for power generation resulting in the development of a solar energy distributed power network with multi-gigawatt potential which may power entities directly or via interconnection with existing grid power systems. This roadway solar "line array" deployed in the median, on the side or breakdown lane or as lane dividers creates a system that produces DC current that is then passed through inverter, which converts to AC current and voltage. Power is also fed to the system by a network of vehicles deployed and installed with portable or permanent solar power gathering devices seamlessly mounted to their vehicles and containing linked battery packs that can be stored either in the trunk, inside the vehicle or attached to the exterior of the vehicle. small noiseless to low noise wind turbines to utilizing large stretches of continuous available public and private roadways via easements, leases or the purchase specified rights to create thousands of miles of contiguous and semi-contiguous networks of interconnected wind turbine power generation. The wind turbines may be mounted in the median, breakdown lanes or just off of the highway or major roadway. This deployment may run with a complimentary set of installations that uses small noiseless to low noise wind turbines to generate wind power by affixing those wind power generating devices to motor vehicles. Large fleets of motor vehicles driving along available public and private roadways may each be affixed with wind power gathering devices and the energy derived from these devices may be used to power elements of the vehicle directly, or may be used to gain credits for fuel, goods or sold for currency. Rest areas and service stations along with all retail outlets can make these vehicle wind generating systems available for easy purchase and installation for the motor vehicle owner. Power depots where energy is deposited from fixed and vehicle deployments, installation areas and billing systems can be combined to service both fixed and vehicle deployment installations to gain efficiency and save on infrastructure cost The power generated by the solar and wind energy gathering systems can be used to both connect to a grid or to power homes businesses or systems without connecting to existing grid systems. Power generated and stored in the portable battery system can be transferred into the network power system at Power Depots which can be designed and installed at the same or different points of interconnection and direct distribution as the line array panel outputs. Power is logged by the electricity meters and is either consumed immediately by home or business loads, or is sent out to the general utility grid network. The utility meter spins backwards, or two meters are used to record incoming and outgoing power. The inverter shuts down automatically in case of utility power failure for safety, and reconnects automatically when utility power resumes. Solar power arrays and fixed wind turbines can be situated on a median, breakdown lane or nearby running contiguous with major roadways and offer numerous conveniences such as easy access to the grid, easy maintenance access and direct powering opportunities to homes and businesses with a potential installation footprint of hundreds of thousands of miles of available roadways.

The present invention, in accordance with one embodiment relates to the creation of a massive solar power generating infrastructure system where solar power generating devices are networked together along public and private roads creating the largest contiguous or semi-contiguous solar power generating and distributing system ever built. This specific embodiment envisions nearly continuous solar panel and or thin film and "solar paint" mounted and deployed in the median, breakdown lane and lane dividers and connected or networked together either through a battery pack system or then to one kind of inverter for grid interconnection or another kind of inverter for direct distribution to power users. Using an inverter applies power conditioning to the solar generated power to enable the connection of the solar generated power to the grid system or locally distributed power users depending on the specific type of inverter. There may also be instances where continuous solar 'strip arrays' may be connected to a single power source changing unit, or simply tied together in a parallel line connection before being connected to the inverter. Whatever network inverter is used may also need to have an electric meter installed between the power generated by the system to the grid or customer and the inverter. Unlike most solar gathering arrays the implementations of the arrays in this system will be mounted close to the ground, some on the ground, lane dividers or guardrails and rise no more than ten to fifteen feet high to fit into the environmental constraints of highway and roadway deployments and enabling easy access for maintenance crew. These solar 'strip arrays' may be connected together in parallel along with a battery back up or backup power system in the event that the grid system fails. The parallel 'strip array' systems power deployments and distribution points will be based upon local usage locations and access to grid points. The 'strip array' system may be automated containing switches to feed the grid from the local, strip array, that is networked together via battery system or wired in parallel to pass the electricity to the next closest strip array parallel line or battery storage facility or to local power distribution users based upon need. The effect of hundreds or thousands of miles of this implementation is to form a sub grid of solar, and possibly other, clean power energy sources, where each distribution or interconnection point may be measured with a standard electricity power meter at or near the electricity's point of entry into the grid or direct distribution customer system to gauge accurate electricity usage for billing purposes. In a preferred embodiment solar strip arrays are deployed on a highway system in the median on the ground level, or on top of the median barriers, or on top of other clean power gathering devices in the median such as wind turbines. Solar voltaic paint systems would gather energy from painted lane dividers and solar film would be mounted upon guardrails. These mixed systems would also be used as is most efficient on or around breakdown lanes and on or around toll booth installations. The strip arrays would be networked together and then joined by running a power line in parallel or battery storage and then through an inverted to condition the electricity properly for use in a grid system or via direct distribution. Power lines may be connected directly to sources or buried or flown to appropriate distribution points based upon the physical characteristics of specific implementations as well as private, local, state and federal regulations and specifications. The vehicle solar energy gathering system is made to run in tandem and be complimentary with the 'line array' system. With the potential deployment of millions of vehicles whose owners have elected to participate in, and be compensated by, the vehicle solar energy gathering network system creating one of the largest semi-contiguous solar power generating network installation and distributing systems ever built. This specific embodiment envisions millions of solar paneled, thin film and "solar paint" mounted and deployed vehicles installed with these solar energy gathering devices for little or no charge to the vehicle owner. The cost of acquisition of the equipment is borne by the network owners, who work in conjunction, or can be the same party as, various parties who have economic or strategic initiatives to participate in the network including the vehicle installation entity for the network system, the roadway or highway municipality owners and the power distribution and billing depots. The installation systems, billing systems and payment systems described for solar and wind energy herein can be combined into a single unified network. A specific embodiment to incorporate the wind energy gathering infrastructure systems relates to the creation of a massive wind power generating infrastructure system where small, nearly noiseless wind power generating devices are networked together along public and private roads creating the largest contiguous and semi-contiguous wind power generating and distributing system ever built. This specific embodiment envisions five hundred wind turbines per mile mounted in the median and connected or networked together either through a battery pack system or then to one kind of inverter for grid interconnection or another kind of inverter for direct distribution to power users. Using an inverter applies power conditioning to the wind generated power to enable the connection of the wind generated power to the grid system or locally distributed power users depending on the specific type of inverter. There may also be instances where multiple turbines may be connected to a single power source changing unit before being connected to the inverter. Whatever network inverter is used may also need to have a electric meter installed between the power generated by the system to the grid or customer and the inverter. Unlike most wind gathering turbines the turbines in this system will be mounted close to the ground and rise no more than ten feet high to catch wind generated by passing cars and enabling easy access for maintenance crew. Pods of wind turbines will be connected together along with a battery back up or backup power system in the event that the grid system fails. The pod systems will be based upon local usage locations and access to grid points. The pod system may be automated containing switches to feed the grid in the local pod, pass the electricity to the next closest pod or to local power distribution users based upon need. The effect of hundreds or thousands of miles of this implementation is to form a sub grid of wind, and possibly other, clean power energy sources, each distribution or interconnection point may be measured with a standard electricity power meter at or near the electricity's point of entry into the grid or direct distribution customer system to gauge accurate electricity usage for billing purposes. In a preferred embodiment small helix or double helix designed wind turbines are positioned in the median or breakdown lane to take advantage of the wind generated by vehicles as they pass. This kind of wind is known as "dirty" or uneven wind in the wind turbine business, but the helix or double helix style wind turbines are suited to take advantage of this condition to generate power, even when the wind is in cross directions from the wind currents of traffic headed in opposite directions. This condition will cause the helix-style turbine to speed up, while it may hinder the ability of a windmill style turbine to generate energy efficiently. This embodiment also runs in tandem to a complimentary deployment that relates to the creation of a massive wind power generating infrastructure system where small, nearly noiseless wind power generating devices are affixed to vehicles who secure the acquisition of the devices through a special lane, similar to the FastLane designee on a toll road, or local access point to a busy roadway. The portable wind power turbine system pack consists of a small wind turbine and battery charging system. The turbine may be metered to provide charge to an existing car battery or electric car battery or it may be gathered to a separate unit battery, which when a light indicates the battery is full, is then available for drop off for deposit of power into the system electricity depot for a credit against toll costs or for cash credit. The portable wind turbine devices may be installed on the hood, top, sides, rear bumper area or undercarriage of a vehicle using magnets or bracing system that takes as quickly as under 1 minute to install . . . the battery pack may be stored next to the device or in the trunk of the vehicle.

The wind turbines may be propeller, helix, double helix or triple helix style wind turbines. At a wind turbine network distribution or maintenance center the individual vehicle wind system batteries are drained of their gathered power by connection to an inverter and then the vehicle owner or user is credited for the energy that has been gathered, via a credit to that users electronic account, which can be merged with existing FastLane accounts or separately monitored and maintained. Transactions may also be handled on a cash or credit card basis. The electricity processed by the inverter is then distributed back into the grid using one kind of inverter or distributed directly by another kind of inverter. Both distribution methods are measured with meters to effectuate accurate billing. Billing revenue is then shared by the remaining stakeholders, i.e. the company owning the devices, the roadway and the installation and power Maintenance Company. There may be more sub-contractors that are compensated in this process. There may also be fewer compensated parties in the event that one party controls multiple pieces of the system process or in the event that a roadway or public highway is not compensated.

The two systems, wind energy and solar energy gathering systems, can share some or all Power Depot points, maintenance stations and billing systems. Specific energy distribution depots may be designed into the system to store, channel and recondition energy for use in the grid system or to power direct distribution to entities seeking power from the network.

The concept of using roadways as distribution points, fixed solar and wind installations along roadway systems and portable solar and wind energy gathering devices on vehicles and for vehicle owners who do not have to pay to enlist the wind energy gathering devices on their vehicles, where infrastructure to run solar and wind energy gathering and distribution systems via both the fixed installations and vehicle energy gathering systems are easily accessible via roadway distribution points are completely new innovations to the clean energy arena.

FIG. 1 illustrates part of a roadway system implementation that contains fixed wind turbine arrays along a roadway. These ten foot double helix type wind turbine generators (Item 1) are positioned in a linear-equidistant distribution, any consecutive pair of wind turbine generators about fifteen feet apart (Item 2) along a continuous row at the edge of breakdown lanes (Item 3), or within medians or center dividers of a roadway (Item 5). The wind turbine generators are either mounted into the ground multiples of feet deep and sometimes set into a foundation, or secured via magnets, braces and ties to metal structures (Item 4). Helix type wind turbine generators are not dependent on single direction wind, which is good because wind created from passing vehicles comes in uneven and multiple directions or even cross directions (Item 6) at the median point of the roadway and helix type wind turbine generators, in particular, of the double-helix type are suited to work well in these conditions. Double helix wind turbine generators are also relatively noiseless in operation which allows using these turbines very close to humans. These double helix type wind turbine generators are linked together in an energy gathering chain with one or more turbines feeding a single or array of batteries appropriate to the power generation of the individual and groupings of turbines. There can be many, for examples, thousands of battery arrays along a single roadway implementation (Item 7).

The electrical energy of a ground-based energy storage system storing energy generated, for example, from one or more wind energy generating devices, for example, a battery or battery array, can be fed to an inverter and then passed through a power meter as the power generated, for example, by the wind turbine generators is either delivered into a utility grid system, directly distributed to a home or business, or stored for later use, for example, at peak energy demand times, by either larger battery arrays, or via the use of the wind energy to convert to hydrogen and then conversion of the hydrogen back to energy using a hydrogen fuel cell technology for vehicles or grid power usage (See FIG. 5).

Figure 2:
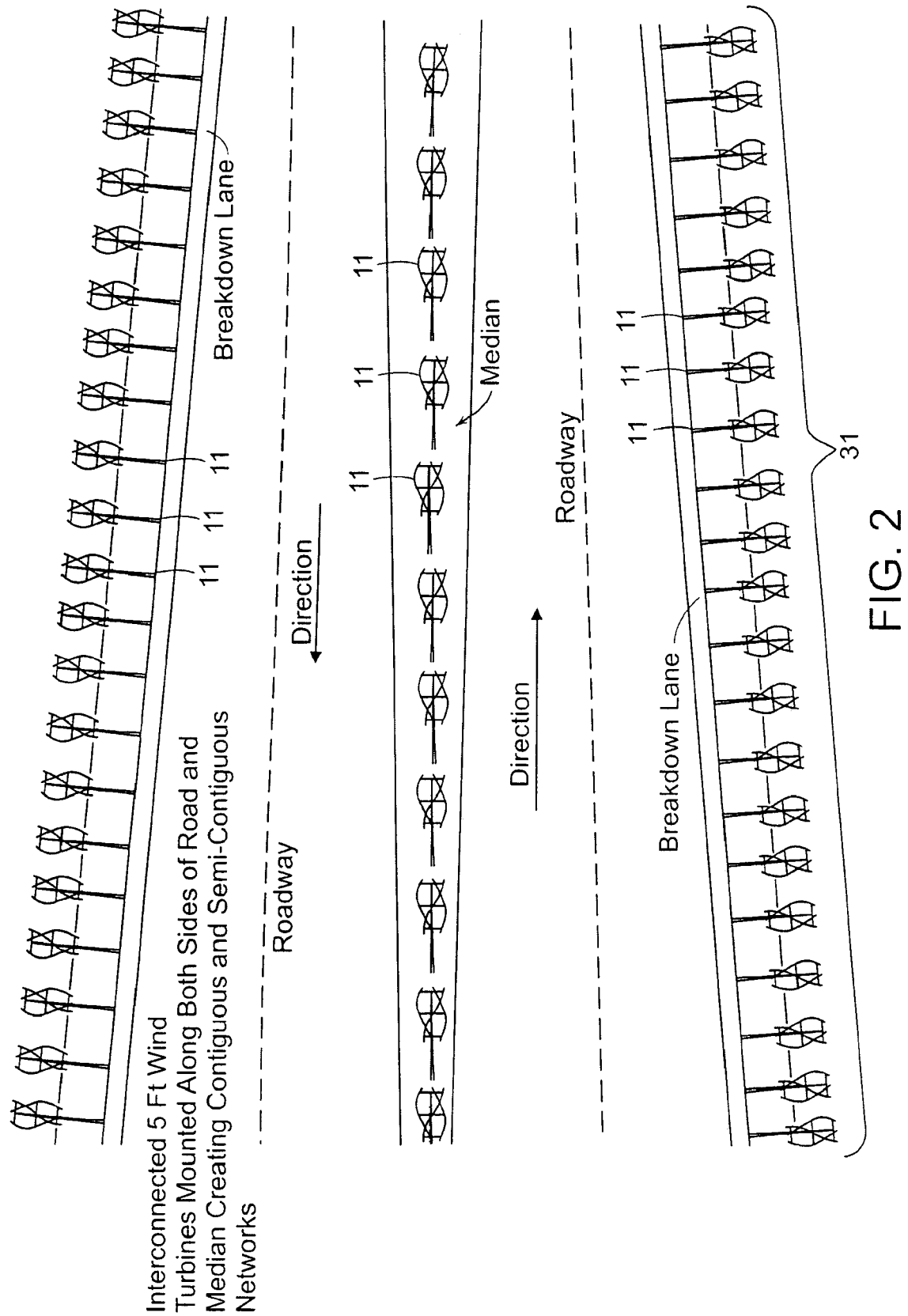
FIG. 2 illustrates the use of 5 foot high turbines.

FIG. 2 illustrates part of a roadway system implementation that contains fixed wind turbine arrays along a roadway. Here, the use of five foot double helix type wind turbine generators (Item 11) is shown. Typically, these five foot double helix type wind turbine generators can generate less energy than the ten foot double helix type wind turbine generators, but because they are smaller, they only need to be 5 to 7 feet apart or less. Accordingly, they can be used at higher density along roadways. Because the ten foot variety is higher up, the five foot variety may be installed within the ten foot variety installation and both turbines may work along the same roadway virtually side by side creating a layered effect. Generally, this layered distribution in which different sized turbines function at their own height can be used with wind turbine generators having heights from about 25 feet down to about a few micrometers. The established concept of using battery arrays, inverters and meters and distributing the power to the grid, direct distribution or reserve storage remains in force for all sizes of turbines. The turbines may be deployed in a total contiguous manner (Item 31) or in a semi contiguous manner based upon roadway wind conditions, roadway design constraints, access to utitility grid, access to power storage and access to direct distribution sources (See FIG. 5).

Figure 3:
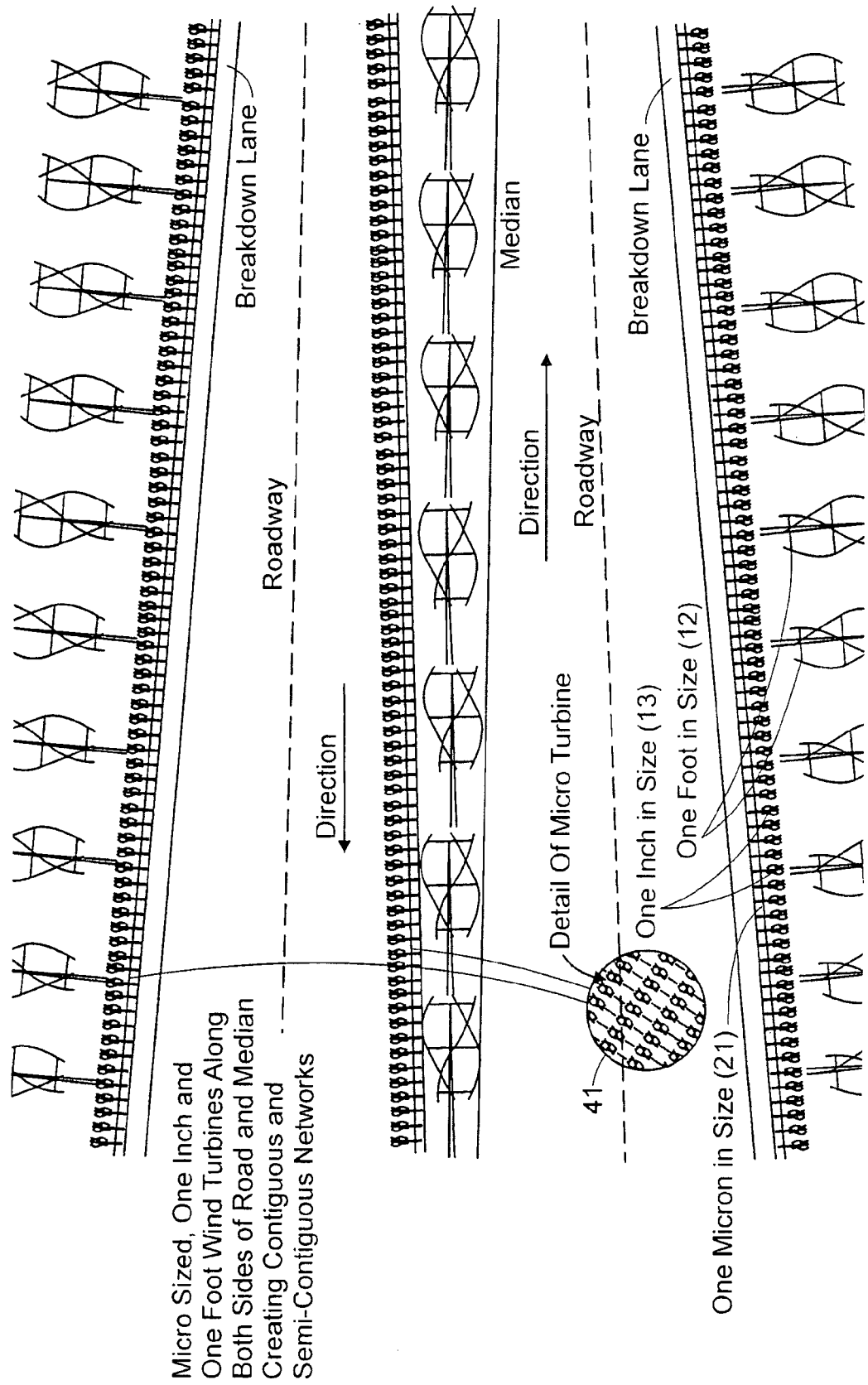
FIG. 3 illustrates the contiguous deployment of one foot long and tiny one micron to multiple micron height wind turbines.

FIG. 3 illustrates the contiguous deployment of one foot double helix type wind turbine generators (Item 12), one inch double helix type wind turbine generators (Item 13) and one micrometer to multiple micrometer high double helix type wind turbine generators (Item 21). Smaller wind turbine generators allow a larger number of wind turbine generators to be deployed within a given area than large wind turbine generators. Foot long turbines (Item 2) may be deployed only 1.5 or less feet apart depending on the terrain and angles of deployment relative to each turbine in the contiguous or semi-contiguous installation, while micron length turbines can be deployed in the millions over a square foot (Item 41).

Figure 4:
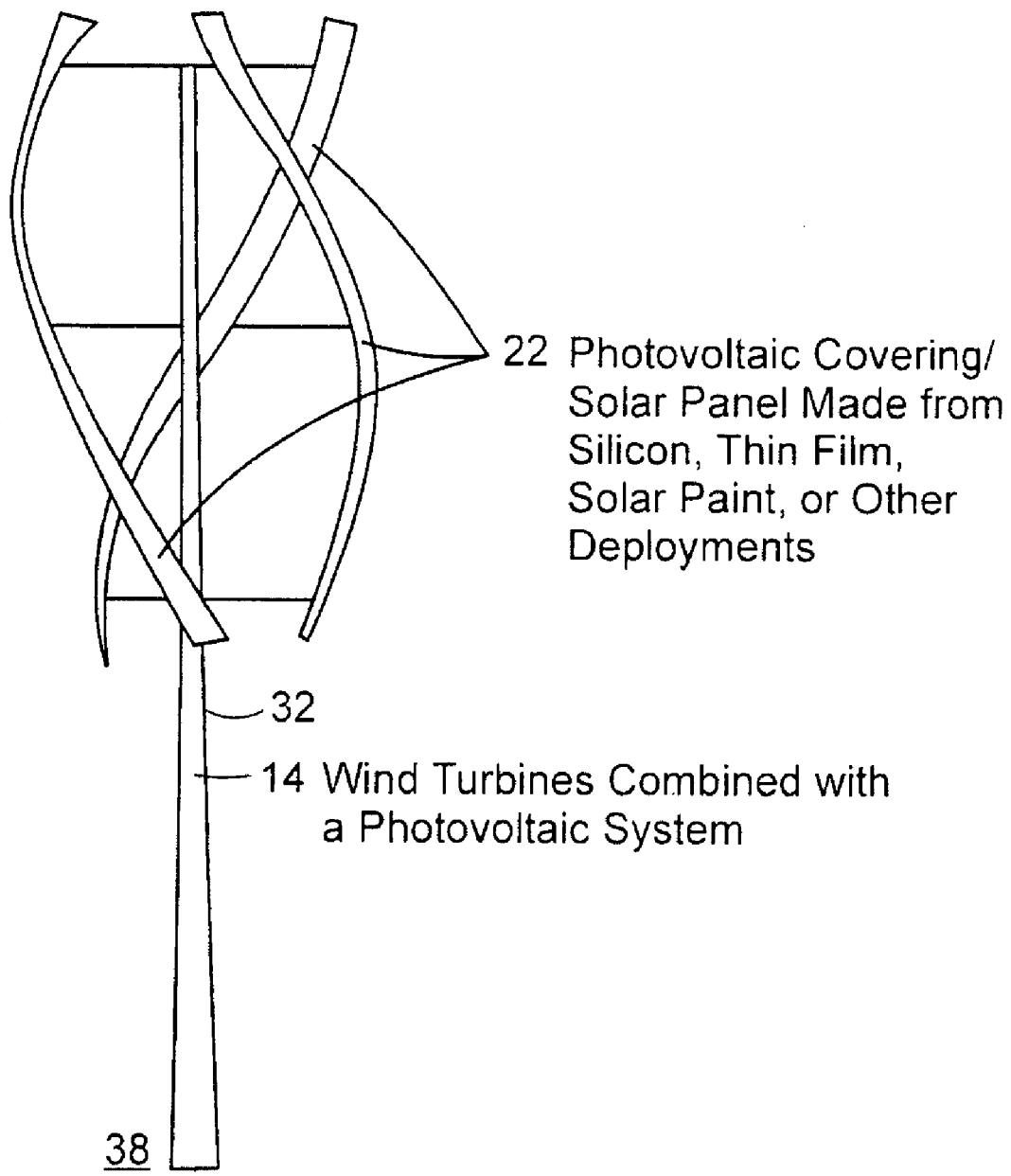
FIG. 4 illustrates the use of wind turbines that may be covered in solar gathering materials such as thin films that may be molded to parts of the turbine.

FIG. 4 illustrates a helix type wind turbine generator (Item 14) that may be covered in solar gathering photovoltaic materials such as silicon thin films that may be molded to parts of the wind turbine generator that do not interfere with the wind turbine generator's fundamental operation, for example, the parts indicated by Item 22. The solar energy that is gathered is then fed to a central rod (Item 32) and carried down the base of the wind turbine generator (Item 38) where it can then be channeled via wiring typical to the industry into a ground-based energy storage system, for example, a battery pack or battery array deployment.

Figure 5:
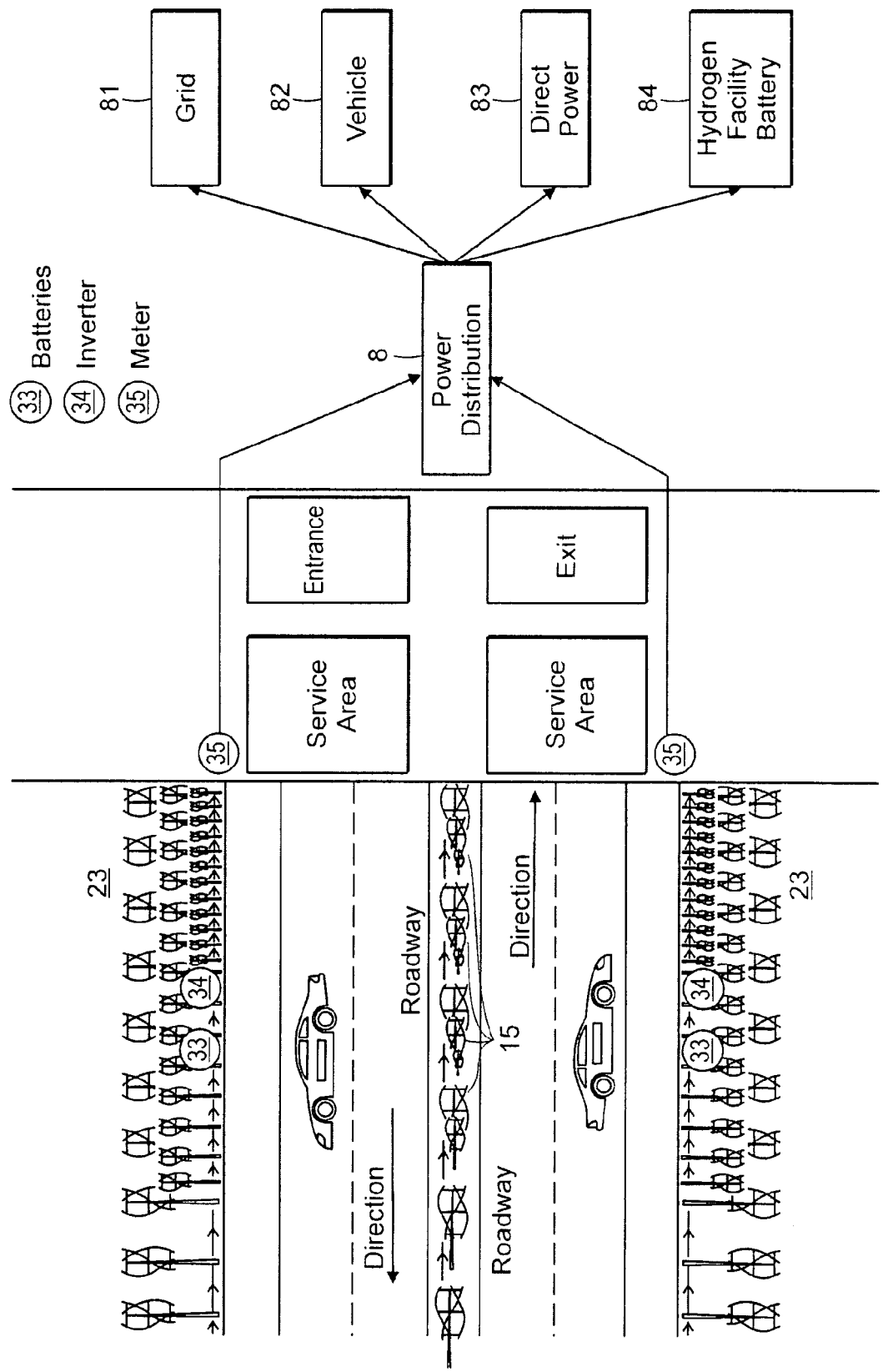
FIG. 5 illustrates the helix-designed wind turbines implemented in a stratum layered design along the median and breakdown lanes of a roadway.

FIG. 5 illustrates helix type wind turbine generators implemented in stratum layered design along the median (Item 15) and breakdown lanes of a roadway (Item 23). Power generated from the wind turbine generators is passed to battery arrays (Item 33), then inverters (Item 34) and registered through meters (Item 35) before being distributed (Item 8) to the utility grid (Item 81), direct power of homes or businesses (Item 82), powering of vehicles (Item 83) or stored in auxiliary battery arrays or to a hydrogen facility (Item 84) that can use the power to form hydrogen using an electrolysis process, store the hydrogen, and release the energy stored in the hydrogen, that is, convert the hydrogen to produce power. The hydrogen facility could produce power from the stored hydrogen, for example, in times of an emergency or at peak demand times.

Figure 6:
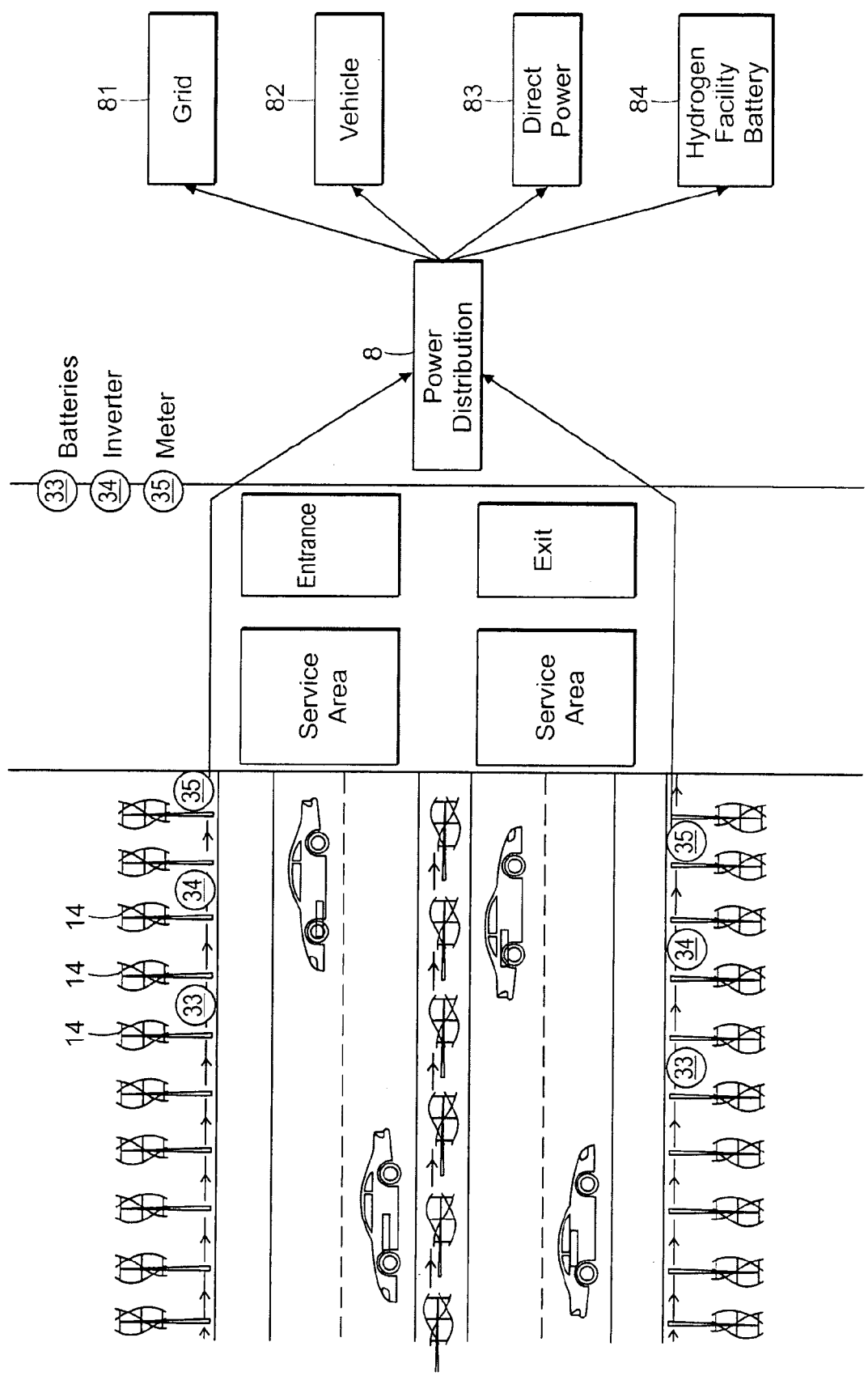
FIG. 6 illustrates the helix wind turbine power generation installed on roadways in a single uniform height.

FIG. 6 illustrates helix type wind turbine generators (Item 14) implemented as a single uniform height turbine system delivering power into battery arrays (Item 33) then to inverters (Item 34) and registered in power meters (Item 35) then distributing the power (Item 8) to the utility grid (Item 81), direct distribution (Item 83), auxiliary power storage (Item 84) or vehicle usage (Item 82).

Figure 7:
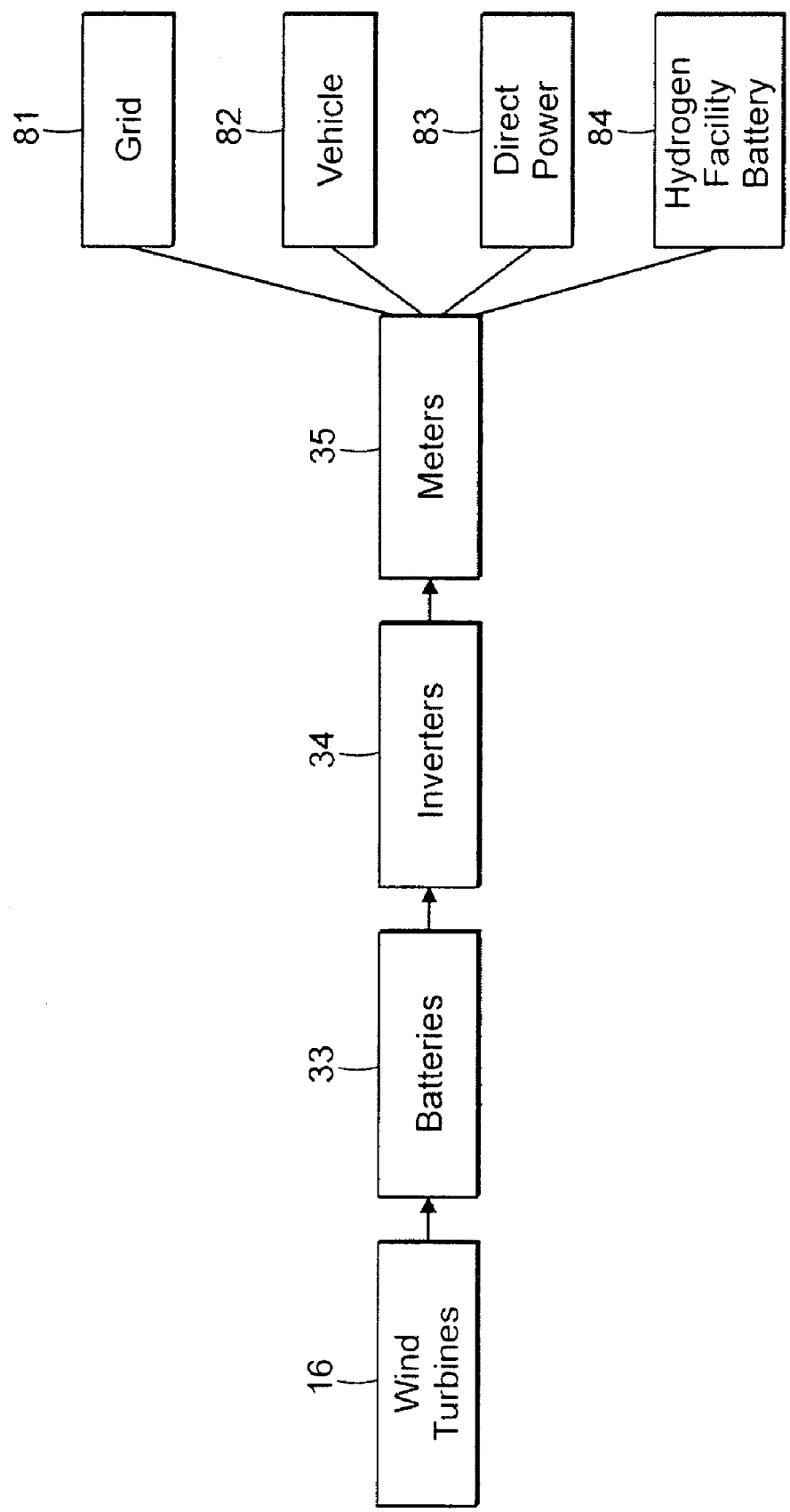
FIG. 7 illustrates a flow chart for how the wind energy generation by the helix designed turbines flows through the system.

FIG. 7 illustrates schematically the flow of electrical energy or power generated by wind energy generating devices, for example, wind turbine generators (herein also "wind turbines") (Item 16) through a roadway system. The wind turbines generate energy (Item 16) which is passed via connected wiring to one or more ground-based energy storage systems, for example, battery arrays (Item 33). The energy is then passed from the battery in DC form to one ore more inverter (Item 34) which change the electricity to AC form and conditions the electricity to the specifications needed by the distribution point, where it is run through a meter (Item 35) then distributed to the utility grid (Item 81), one or more vehicles (Item 82), a direct distribution point such as a home or business (Item 83), fueling of an electric or hydrogen electrolysis machine or further storage via hydrogen conversion electrolysis or auxiliary battery array storage (Item 84).

Figure 8:
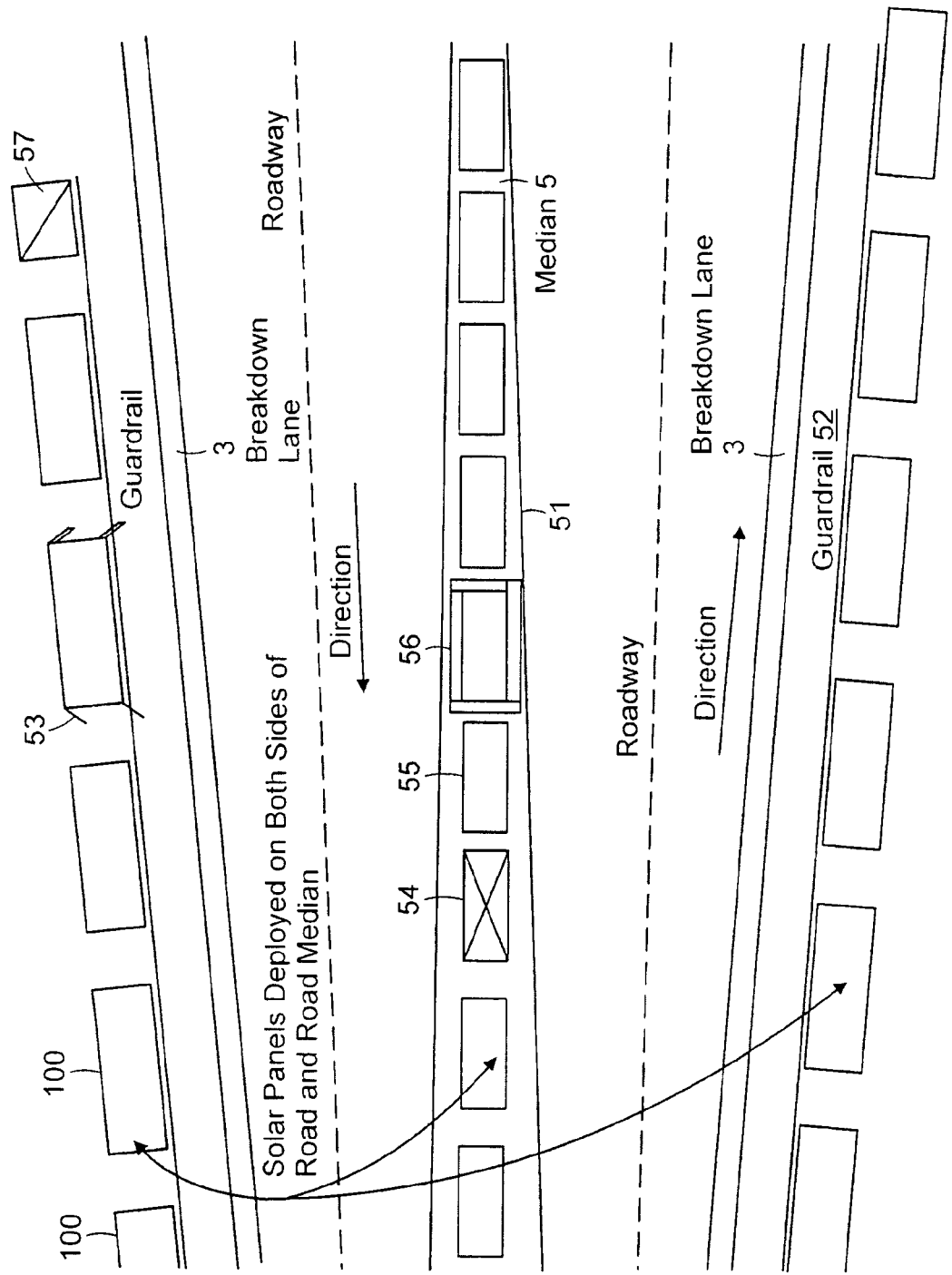
FIG. 8 illustrates solar panels positioned as contiguous strips of solar backed films deployed along the sides and the median of a roadway.

FIG. 8 illustrates solar panels, which may also be contiguous strips of solar backed films (Item 100) deployed along the sides (Item 3) and the median of a roadway (Item 5). Solar films may be easier to implement because they can be cut to fit and they can be printed out in miles of consecutive film during the manufacturing process. Some new films are also not using silicon and are using nanotechnology to create new kinds of solar films such as those developed by Nanosolar (nansolar.com). The ability to manufacture miles of film or to cut smaller pieces in a variety of lengths and widths are preferable in view of road breaks, replacements, maintenance and physical and governmental building restrictions that are factors in individual roadway implementations. Panels or backed films may be mounted to median guardrails (Item 51) or roadside guardrails (Item 52) or may be erected upon rails or beam supporting devices that have been secured into the ground via depth or piling techniques (Item 53). Displays of the panels or films may include custom formation around objects, pyramid configurations (Item 54), facing flat towards the sky (Item 55), mirrored sides (Item 56), or electronic tilts (Item 57) built to maximize the solar gathering materials access to direct contact with the suns rays.

Figure 9:
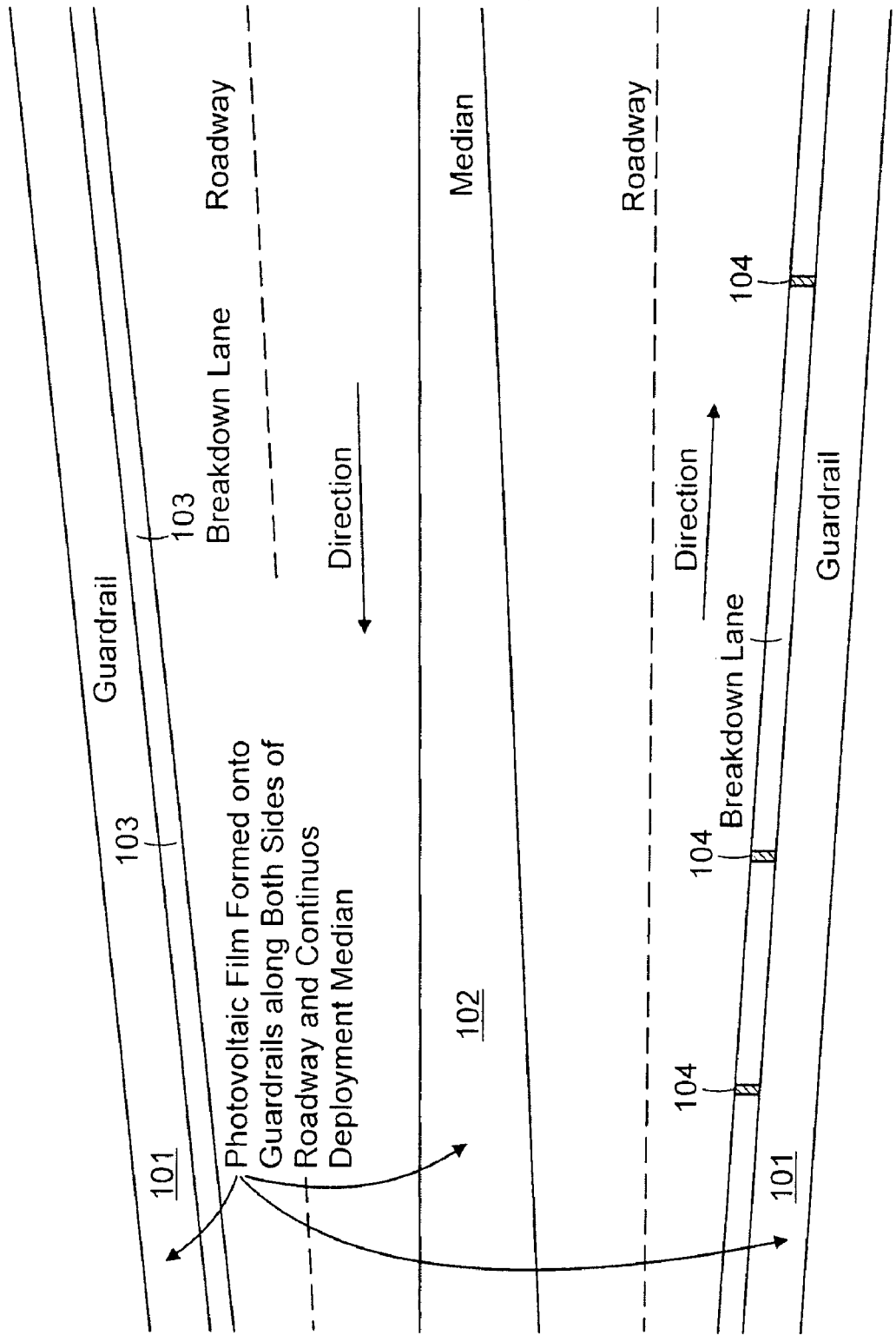
FIG. 9 illustrates solar film molded at the installation site to specific areas of installation to provide a cohesive and continuous or semi-continuous implementation.

FIG. 9 illustrates how solar film can be molded at the installation site to specific areas of installation to provide a cohesive (Items 101, 102 and 103) and continuous (Item 101) or semi-continuous implementation of solar gathering material (Item 104) along a roadway on existing structures of uniform and non-uniform shapes such as guardrails on the side and median of roadways.

Figure 10:
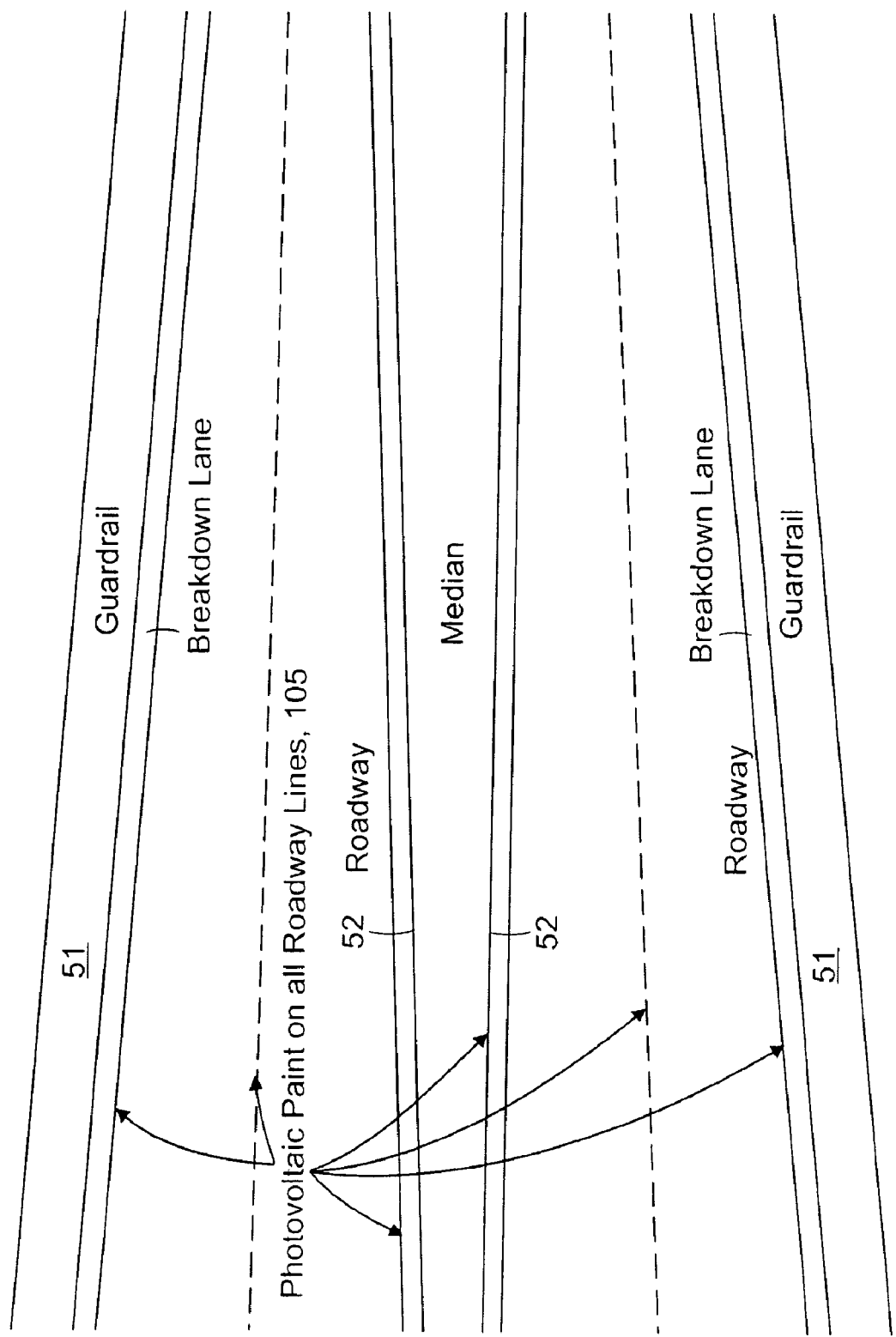
FIG. 10 illustrates the use of spray on solar power cells, herein referred to as solar voltaic paint which may be sprayed onto the roadway.

FIG. 10 illustrates the use of spray on solar power cells, herein referred to as solar voltaic paint which may be sprayed onto the roadway itself as lane markers (Item 105) or onto guardrails (Items 51 and 52) to collect both solar energy and infrared heat using a spray on solar power cell material that utilizes nanotechnology to mix quantum dots with a polymer to create an energy gathering material that may be five times more efficient than current solar cell technology. The sprayed on materials would have conductive infrastructure underneath it similar to solar films and panels with efficiently planned depot points for the energy gathered by the sprayed on materials to be transferred to battery arrays and inverters and then to energy distribution points such as the utility grid, direct distribution or auxiliary storage (See FIG. 5).

Figure 11:
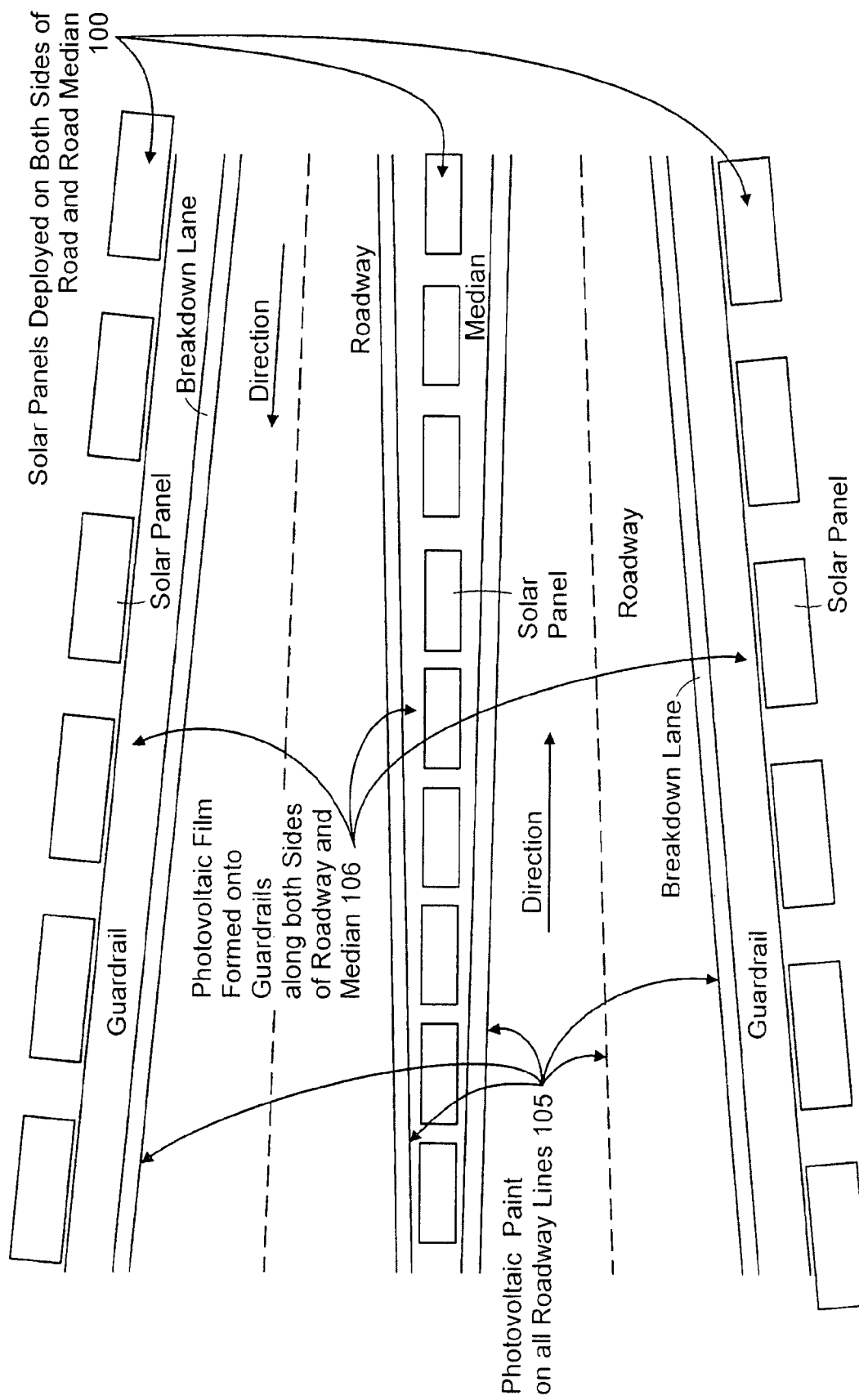
FIG. 11 illustrates solar panels deployed on the roadside lanes in a continuous manner complemented by formed solar films.

FIG. 11 illustrates solar panels (Item 100) deployed on the roadside lanes in a continuous manner complemented by formed solar films with backing formed over guardrails (Item 106) and spray on solar material. Various solar technologies may be used in concert to implement a comprehensive and contiguous or semi-contiguous implementation of solar energy gathering materials along a roadway system. The solar panels, which may also be solar films, deployed on the sides of the roadway and the median along with solar sprayed on power cells, "solar paint", sprayed as roadway markers (Item 105). These roadway markers may also be deployed in wider use on the roadway, particularly in breakdown lanes, to maximize coverage and power gathering potential.

Figure 12:
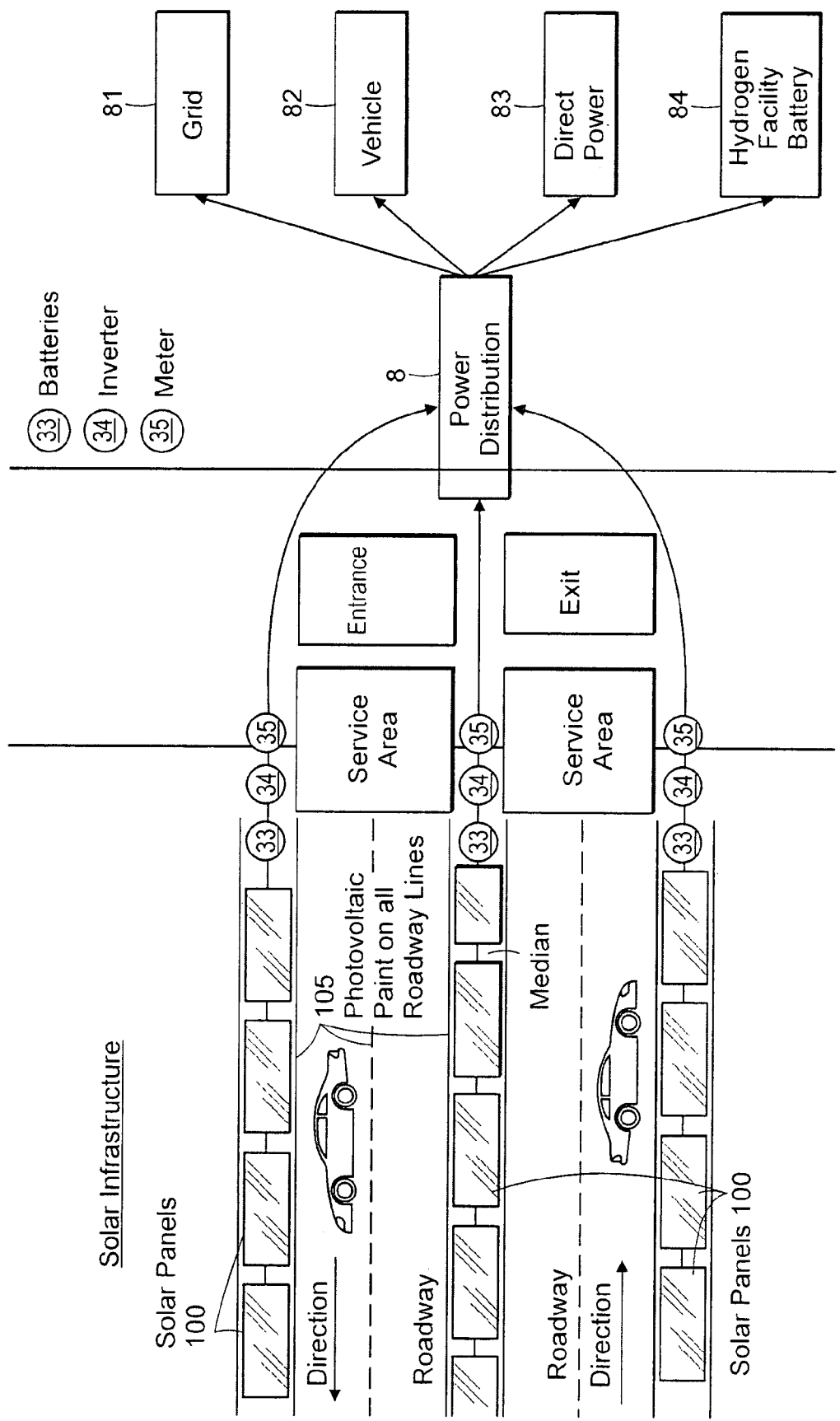
FIG. 12 illustrates solar panels, which may also be solar films, deployed on the sides of the roadway.

FIG. 12 illustrates solar panels, which may also be solar films, deployed on the sides of the roadway (Item 100) and the median along with solar sprayed on power cells, "solar paint", sprayed as roadway markers (Item 105). These roadway markers may also be deployed in wider use on the roadway, particularly in breakdown lanes, to maximize coverage and power gathering potential. The gathered power is transferred via wired connection to battery (Item 33),then to inverters (Item 34) and then to meters (Item 35) which register the amount of energy that is distributed (Item 8) to the utility grid (Item 81), to homes or businesses (Item 83), to vehicles (Item 82) or to and auxiliary energy storage or hydrogen facility (Item 84).

Figure 13:
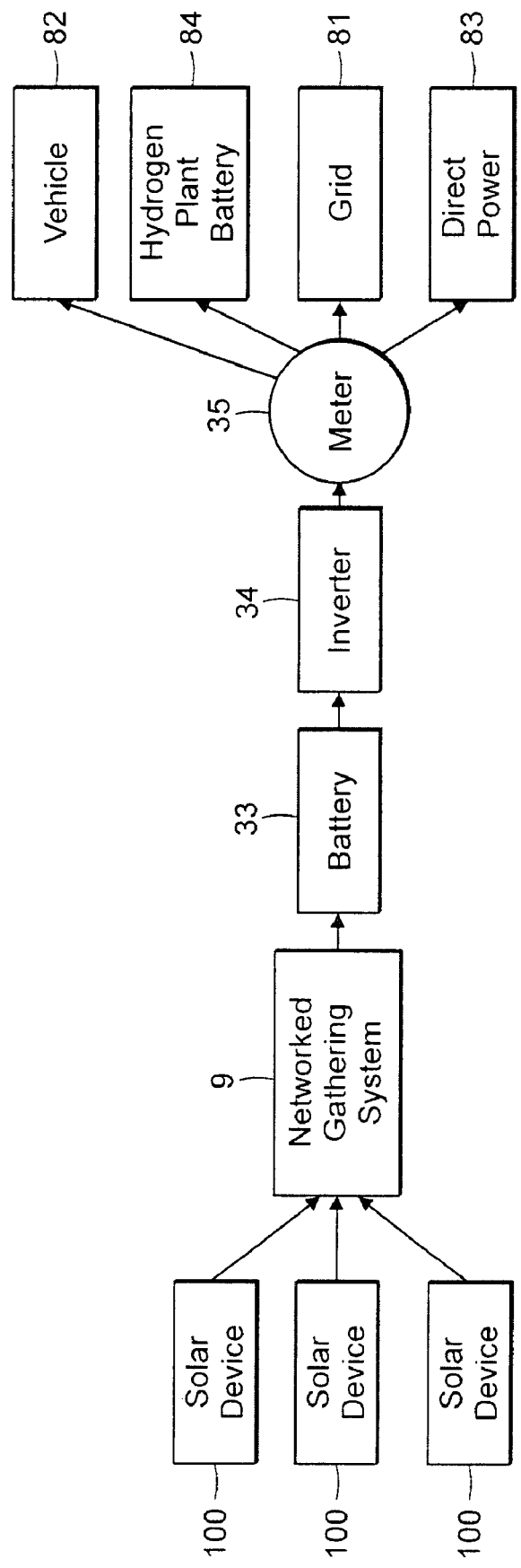
FIG. 13 illustrates a flow chart that defines the steps from gathering to distribution of the solar energy roadway system.

FIG. 13 illustrates a flow chart that defines the steps from gathering to distribution of the solar energy in a roadway system. One or more solar gathering devices such as solar panels, solar films with backing and solar spray on power cells are installed along a roadway in a contiguous or semi-contiguous configuration (Item 100). The solar energy generating devices are networked through a roadway system electricity grid via wiring and input and output connections (Item 9) to efficiently take advantage of batteries and battery arrays as are standard in the solar energy gathering industry (Item 33). The energy stored in the batteries is then passed through an inverter or inverters (Item 34) to condition the energy transmission to a distribution point. As the energy is passed to a distribution point the electricity provided to that point is gauged via the use of an electricity meter (Item 35). Distribution points that may be delivered to include the utility grid (Item 81), a vehicle (Item 82), direct distribution to a business or home (Item 83), hydrogen electrolysis and storage facility or a battery storage facility (Item 84).

Figure 14:
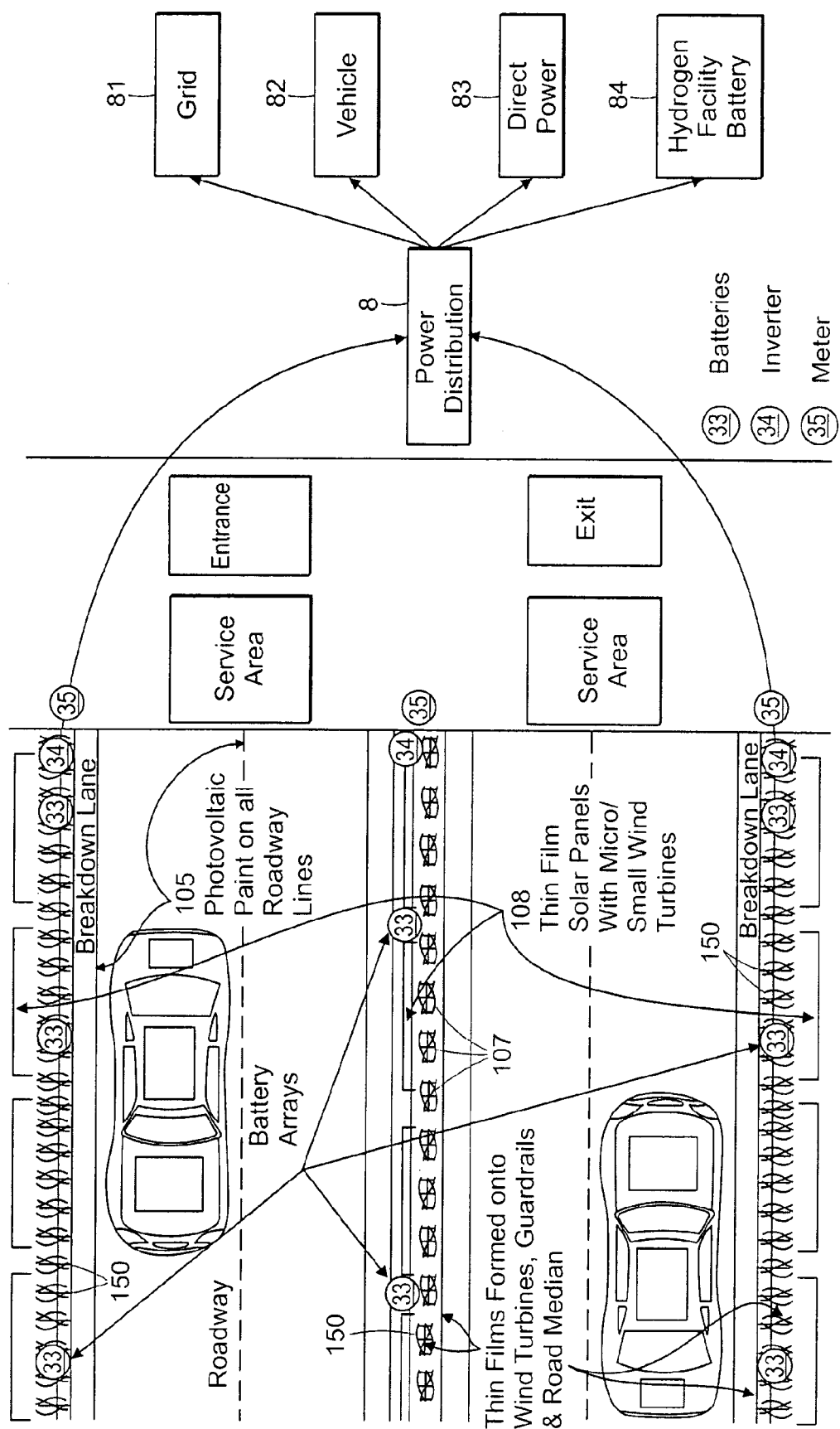
FIG. 14 illustrates the integration of both wind and solar energy gathering systems in tandem implementation along a roadway system.

FIG. 14 illustrates the integration of both wind and solar energy gathering systems in tandem implementation along a roadway system. The system includes installations of both wind and solar systems side by side, next to and even within energy gathering devices. Wind energy generating devices are implemented in stratum layered design along the median and breakdown lanes of a roadway (Item 150). Power generated from the devices is passed to battery arrays (Item 33), then inverters (Item 34) and registered through meters (Item 35) before being distributed (Item 8) to the grid, direct power of homes or businesses, powering of automobiles or stored in auxiliary battery arrays or stored by converting to hydrogen using an electrolysis process and held until the power is needed at such times that would include emergencies or strategically held to be sold to the grid system or direct distribution uses at peak demand times. Wind energy generating devices may also be covered with solar energy generating devices, that is, they may be covered with solar gathering materials such as thin films or spray on solar power cells ("solar paint") that may be molded to parts of the device that do not interfere with the turbines fundamental operation (Item 107). Thin film solar panels may also be combined with small, for example, micrometer sized wind energy generating devices (Item 108). The solar energy that is gathered can either by used to power the wind energy generating device, for example, helix-type wind turbine generator directly when wind power is not available, or make the turbine of the helix-type wind turbine generator spin faster when wind is available, or the gathered solar power is fed to the central rod and carried down the base of the turbine where it is channeled via wiring typical to the industry into a battery pack or battery array deployment (Item 33), then to an inverter (Item 34), meter (Item 35) and then distributed as discussed above. The wind system is part of a complimentary installation where designed areas are allotted for both wind and solar power systems implementation along roadways. The solar system alongside the wind system is comprised of one or more solar gathering devices such as solar panels, solar films with backing and solar spray on power cells are installed along a roadway in a contiguous or semi-contiguous configuration. The solar energy generating devices are then networked via wiring and input and output connections to efficiently take advantage of batteries and battery arrays as are standard in the solar energy gathering industry (Item 33).

Figure 16:
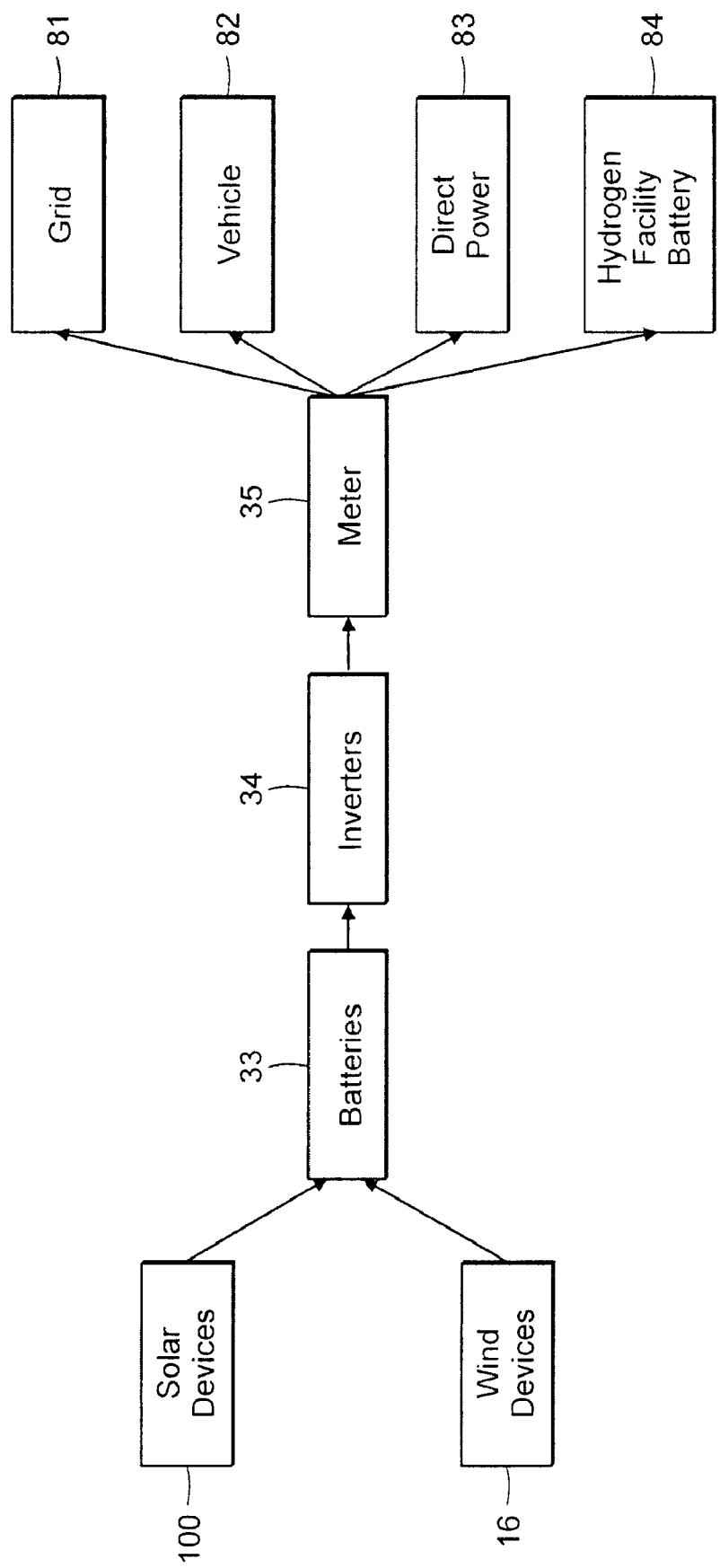
FIG. 16 illustrates a flow chart where both wind and solar energy gathering devices are implemented together.

FIG. 16 illustrates a flow chart where both wind (Item 16) and solar energy generating devices (Item 100) as described in FIGS. 14 and 15 transfer their energy to batteries (Item 33) then to inverters (Item 34) then registering the amount of energy via the meters (Item 35) before being distributed to the utility grid (Item 81), vehicles (Item 82), direct distribution of homes and businesses (Item 83) or utilized as stored energy via large battery arrays or via conversion to hydrogen to be held in compressed tanks via the creation of hydrogen via electrolysis (Item 84).

Figure 17:
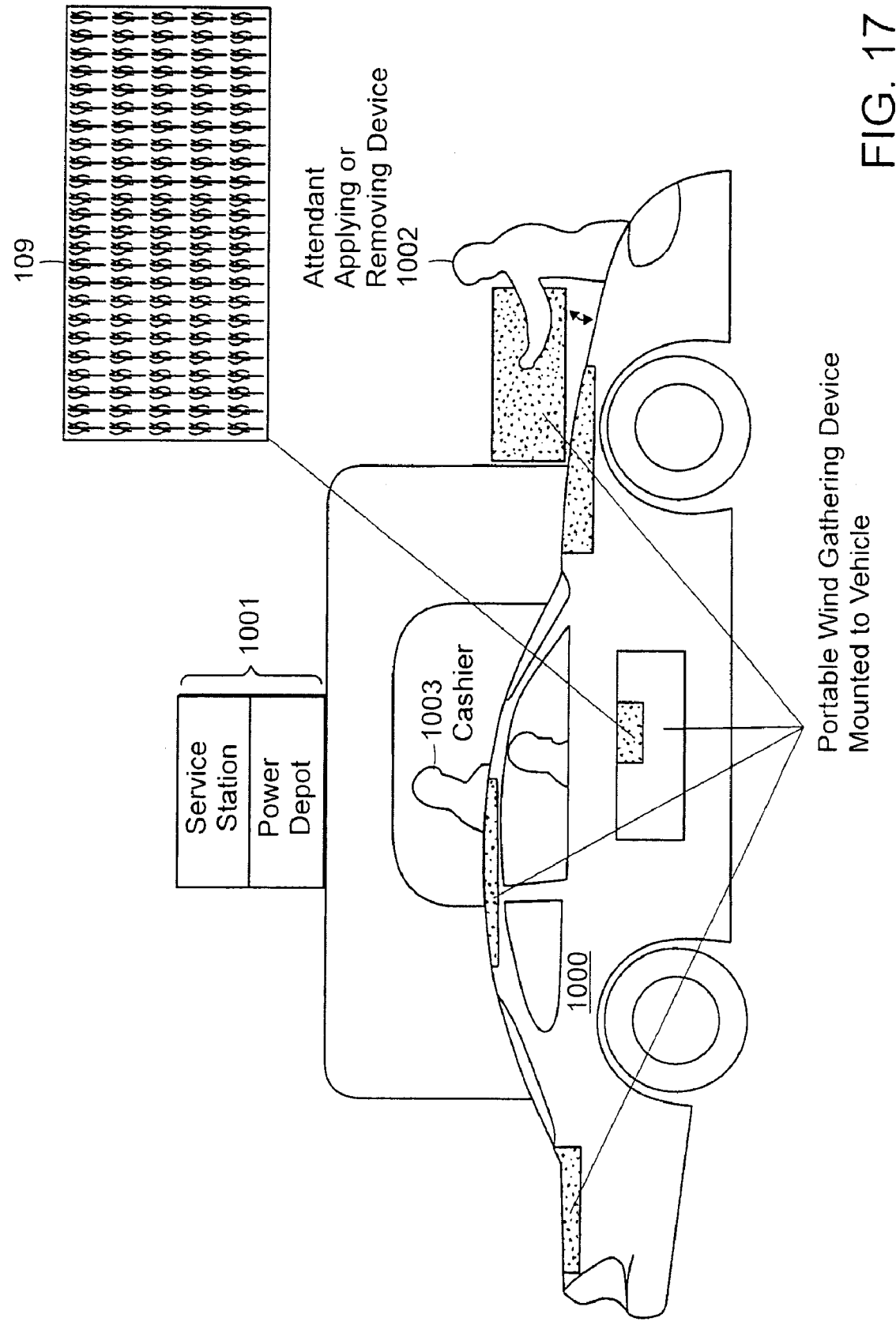
FIG. 17 illustrates the implementation and installation of portable small helix turbine wind energy gathering sheets being installed on a vehicle.
Figure 18:
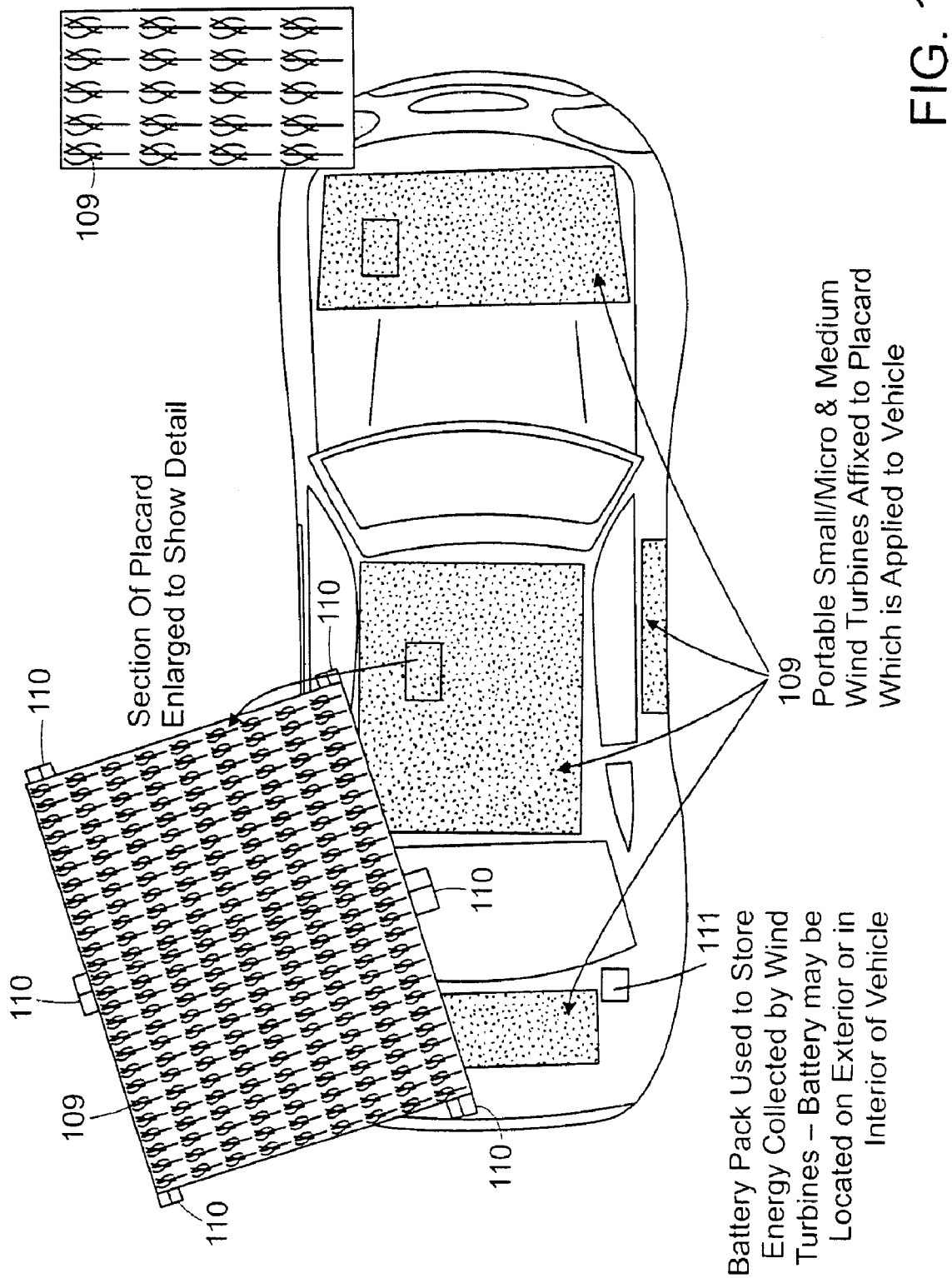
FIG. 18 illustrates the portable helix wind turbine vehicle installation sheets or placards being affixed to a vehicle.

FIG. 17 illustrates the implementation and installation of portable small helix turbine wind energy gathering sheets (Item 109) being installed on a vehicle, for example, an automobile (Item 1000) at an authorized service station and power depot (Item 1001), which may be located at a toll booth, rest area, exit or other location. Once the vehicle and owner are registered into the system the solar gathering unit(s) may be self-installed by the vehicle operator or installed by a trained service center attendant (Item 1002). The helix turbine sheet unit (Item 109) can be installed on the top, bottom or sides of the vehicle. Power derived from the turbines is stored in the vehicle in one or more vehicle-based energy storage systems, for example, a battery or battery packs (FIG. 18, Item 111) which are delivered to service stations (Item 1001) when full for system credit for the energy gathered issued automated or by a cashier (Item 1003). The energy gathered may also be used to directly power elements of the vehicle and the owner would reap a discount for the metered power used or consumed by the vehicle in this situation similar in value to the credit that would be awarded for power gathered by the one or more vehicle-based energy storage systems, for example, a battery or battery pack (FIG. 18, Item 111). System credits can be reimbursed in the form of toll fee credits, cash payments, or credits at participating businesses including power companies and consumer goods companies.

FIG. 18 illustrates the portable helix wind turbine vehicle installation sheets or placards (Item 109) that are affixed to the vehicle via snap on clips (Item 110), adhesive, magnetic bonding, bonded by a static charge between the vehicle surface and the installation sheet (Item 109), via a locking screw mounting system, permanently or removable mounted during the vehicle manufacturing process or overlay bracing. The one or more vehicle-based storage systems, for example, a battery to store the power or battery array may be on the interior, exterior (Item 111), trunk or underbelly, or under the hood of the vehicle. The vehicle helix wind turbines (Item 109) may individually be as small as a micron or up to two feet in length. One turbine or millions of turbines may occupy a single vehicle installation sheet or placard (Item 109).

Figure 19:
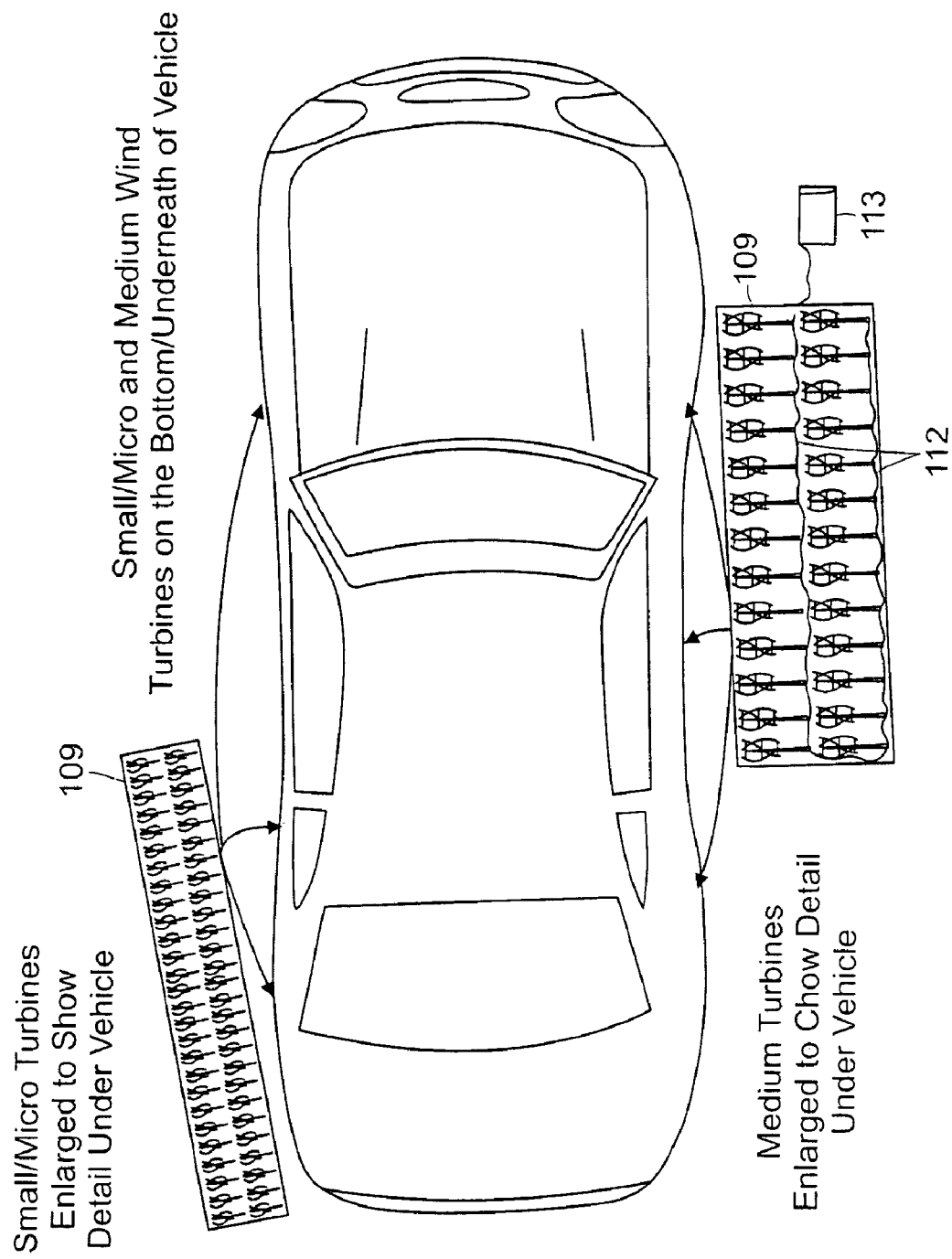
FIG. 19 illustrates helix wind turbine installation sheet are not just meant to be mounted on top of the vehicle but also in available for installation in areas under the vehicle.

FIG. 19 illustrates that the helix wind turbine installation sheet are not just meant to be mounted on top of the vehicle but also in available for installation in areas under the vehicle (Item 109). The lack of uniform wind and the presence of 'dirty wind' makes the use of the helix turbine advantageous and efficient for collecting wind energy from different parts of the moving vehicle. In addition to securing the turbines the installation sheet (Item 109) forms a matrixes grid of wiring (Item 112) that is comprised of wiring taken from the generator of each individual turbine. The matrixes wiring from each turbine is then delivered to the battery for charging in one integrated wired output connection (Item 113).

Figure 20:
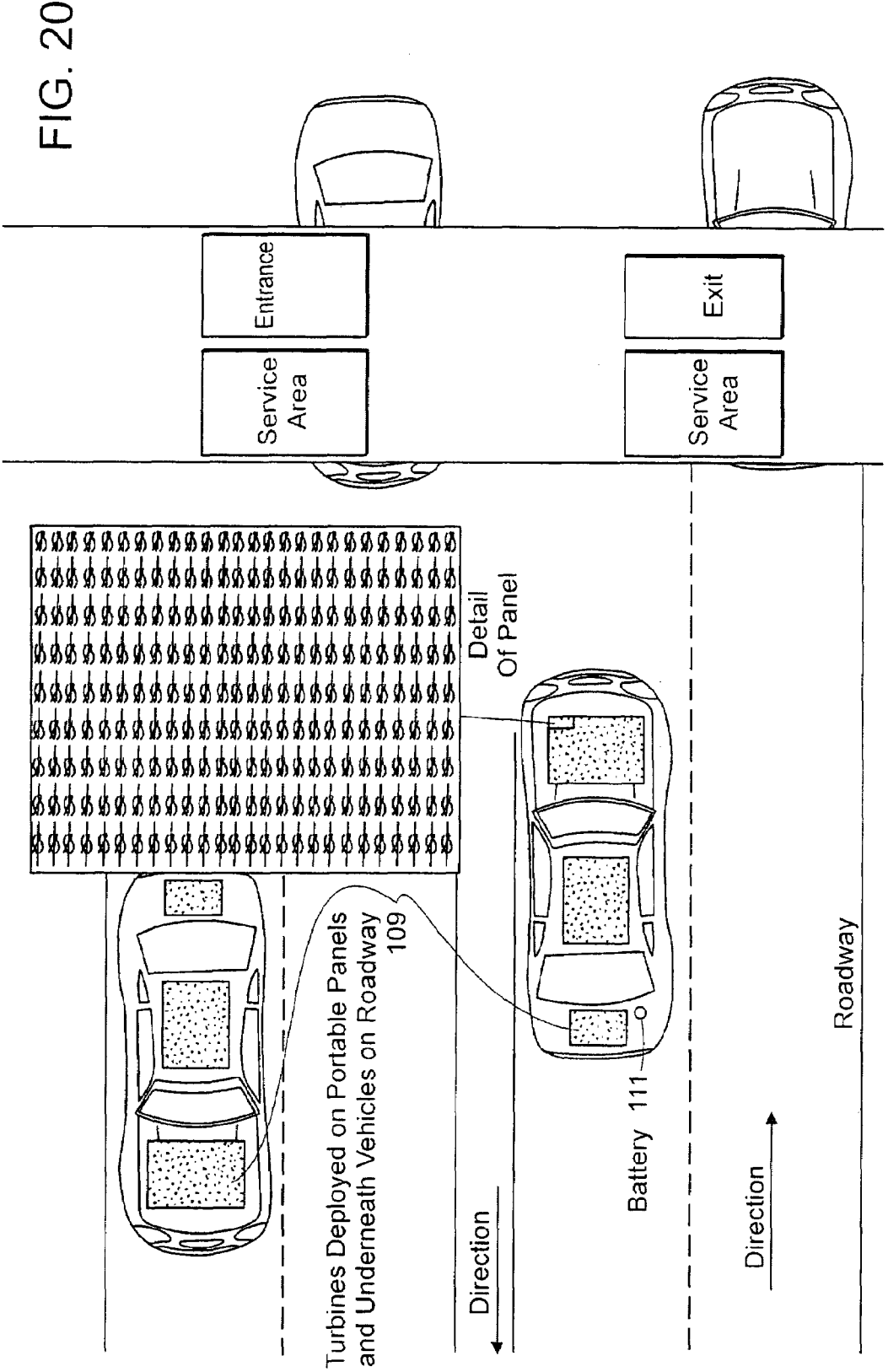
FIG. 20 illustrates an overhead view of vehicles deployed with the helix wind gathering installation sheets or placards including a composite view of an installation sheet.

FIG. 20 illustrates an overhead view of vehicles deployed with the helix wind gathering installation sheets or placards (Item 109), with a composite view of an installation sheet, in operation, traveling along a roadway generating wind power stored in one or more vehicle-based energy storage systems, for example, a battery or battery packs (Item 111) and passing through toll booth service areas (Item 1001) where installation sheets (Item 109) may be installed, removed or where fully charged batteries can be switched out for new batteries or reinstalled. Maintenance and account information may also be obtained at the service areas.

Figure 21:
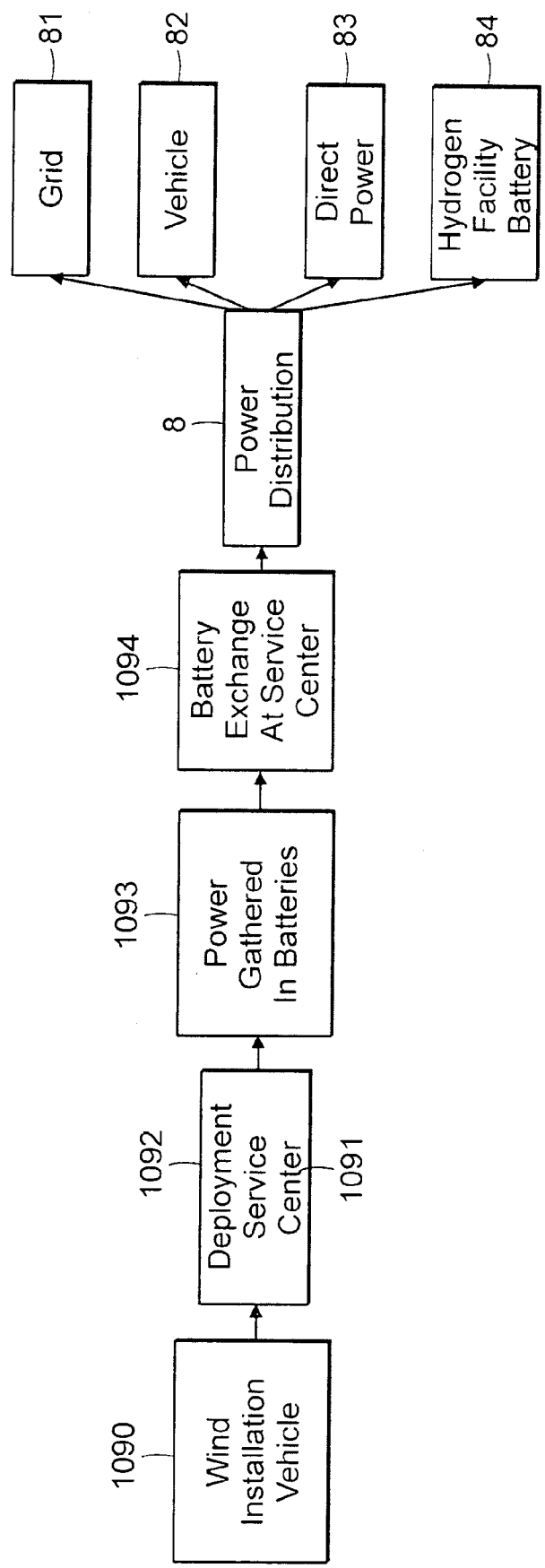
FIG. 21 illustrates a flow chart for the vehicle wind energy gathering system.

FIG. 21 illustrates a flow chart for the vehicle wind energy gathering system. The flow begins with the installation (Item 1090) of the manufactured wind helix turbine installation sheets or placards (Item 109) along with the battery or battery array system (Item 111). The completed installation of the vehicle wind energy gathering system is registered with the vehicle and owner at a service area (Item 1091) and deployed (Item 1092) onto the roadway system to gather energy using the installed one or more vehicle-based wind energy generating devices and vehicle-based energy storage systems (e.g., battery or battery arrays) (Item 1093). The wind gathering system fills the battery or battery arrays with energy stored as electricity by the battery or batter array. The battery packs may then be turned in or exchanged at a service center (Item 1094) where the power gathered by the vehicle wind energy gathering system identified with a vehicle and/or owner is registered and credited to the vehicle and/or owner. The power gathered in the batteries is then prepared for distribution into the system (Item 8) in the form of distribution into the utility grid (Item 81), necessitating a transfer of the battery power through an inverter. The battery power may be utilized directly by a vehicle (Item 82). The battery power may be attached to an inverter for direct powering of businesses or homes (Item 83) or the power may be stored in auxiliary battery arrays or used to convert hydrogen via electrolysis for energy storage or for power hydrogen energy needs (Item 84). By charging the vehicle owner nothing, very little and possibly securing a deposit against the value of the equipment the vehicle owner gains incentive to create value for himself by participating in the gathering of clean energy with no financial investment needed during the service area registration process.

Figure 22:
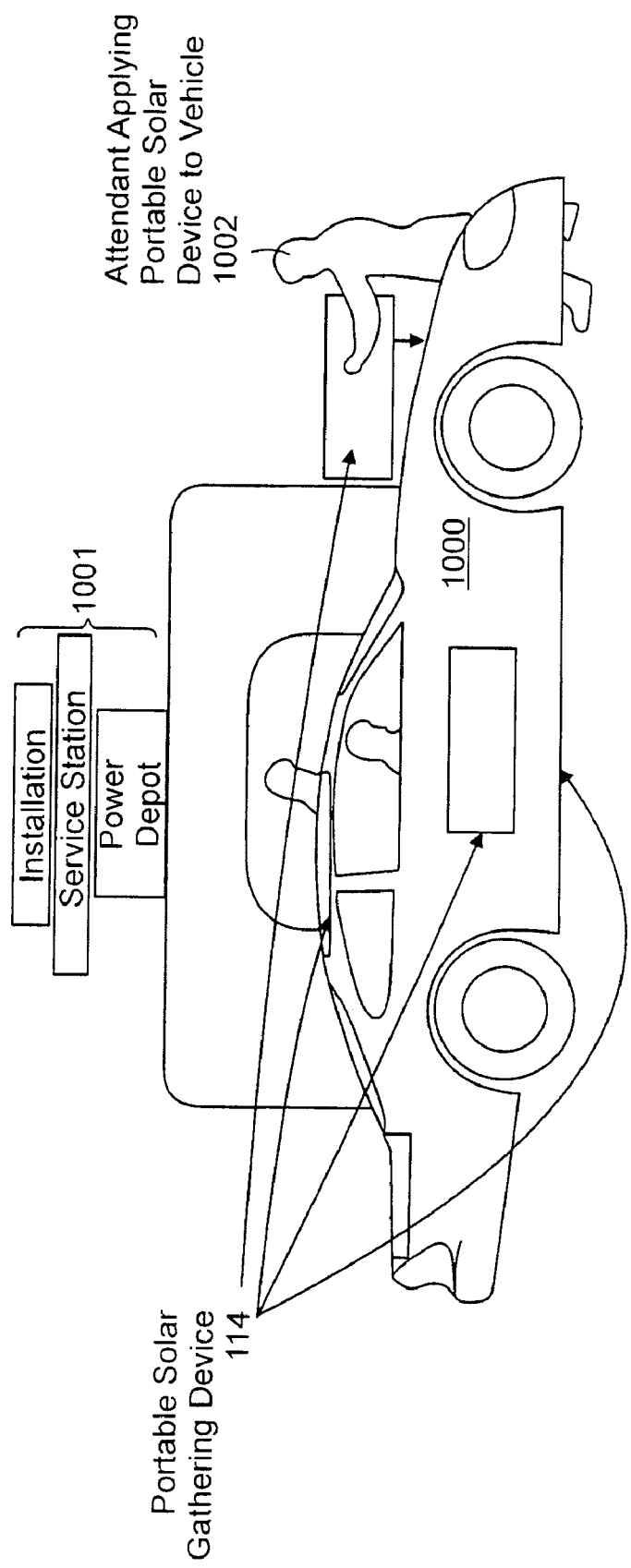
FIG. 22 illustrates the installation of a portable solar energy gathering system at a qualified service area.

FIG. 22 illustrates the installation of a portable solar energy gathering system (Item 114) at a qualified service area (Item 1001) installed on a vehicle (Item 1000) by a service center trained installer (Item 1002). The solar installation sheets (Item 114) may be affixed to the vehicle via snap on clips, adhesive, magnetic bonding, bonded by a static charge between the vehicle surface and the installation sheet, by a locking screw mounting system, permanently or removable installation of a mounting during the vehicle manufacturing process or overlay bracing. The battery to store the power or battery array may be on the interior, exterior, trunk or underbelly, or under the hood of the vehicle. The solar installation sheets may be mounted on the top, hood, trunk or sides of a vehicle.

Figure 23:
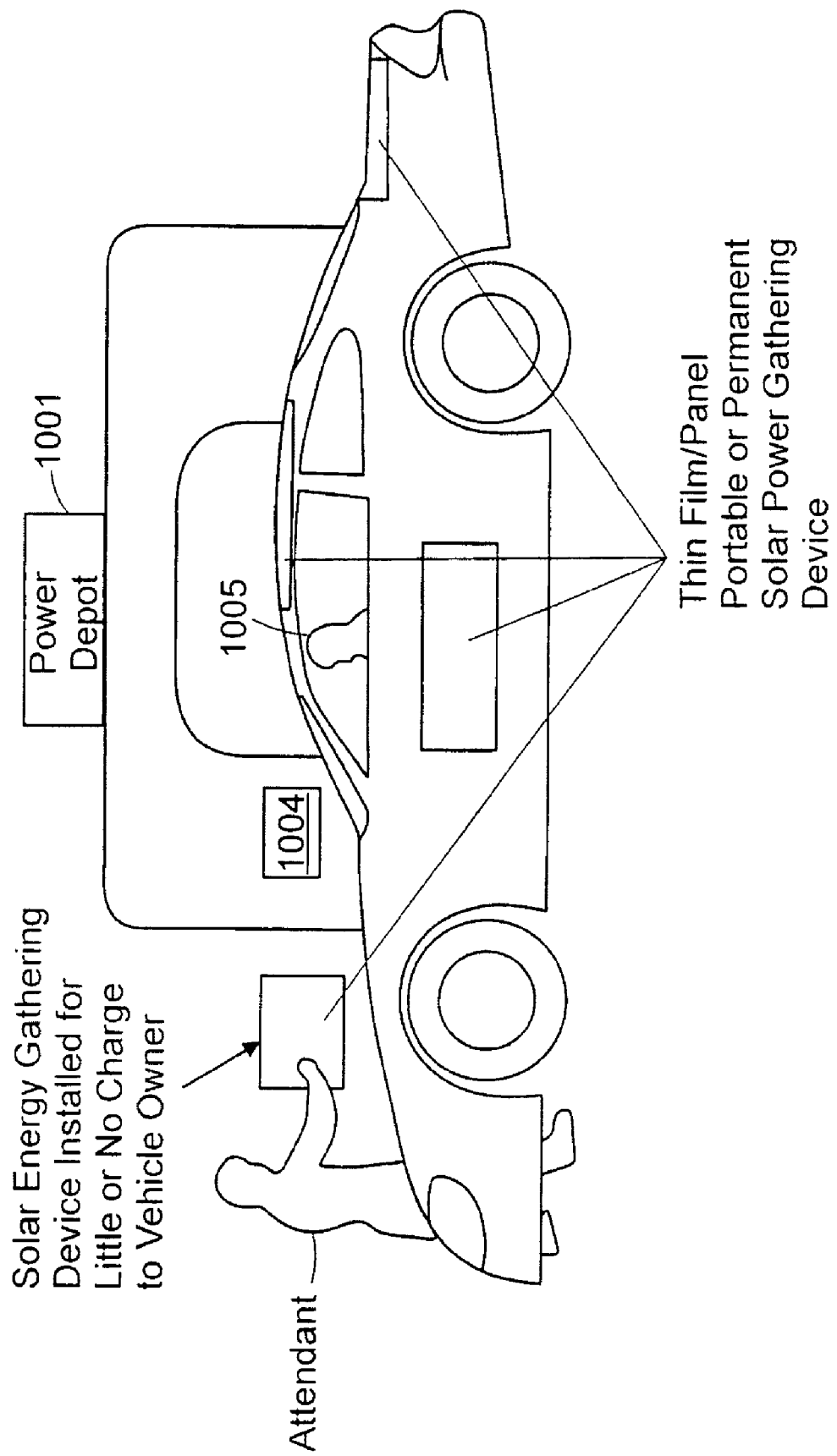
FIG. 23 illustrates that no cash transaction occurs at the time of installation at the power depot service station area.

FIG. 23 illustrates that no cash transaction occurs at the time of installation at the power depot service station area (Item 1000), with the exception of a credit card or other security registration/deposit system (Item 1004). By charging the vehicle owner (Item 1005) nothing, very little and possibly securing a deposit against the value of the equipment the vehicle owner (Item 1005) gains incentive to create value for himself by participating in the gathering of clean energy with no financial investment needed.

Figure 24:
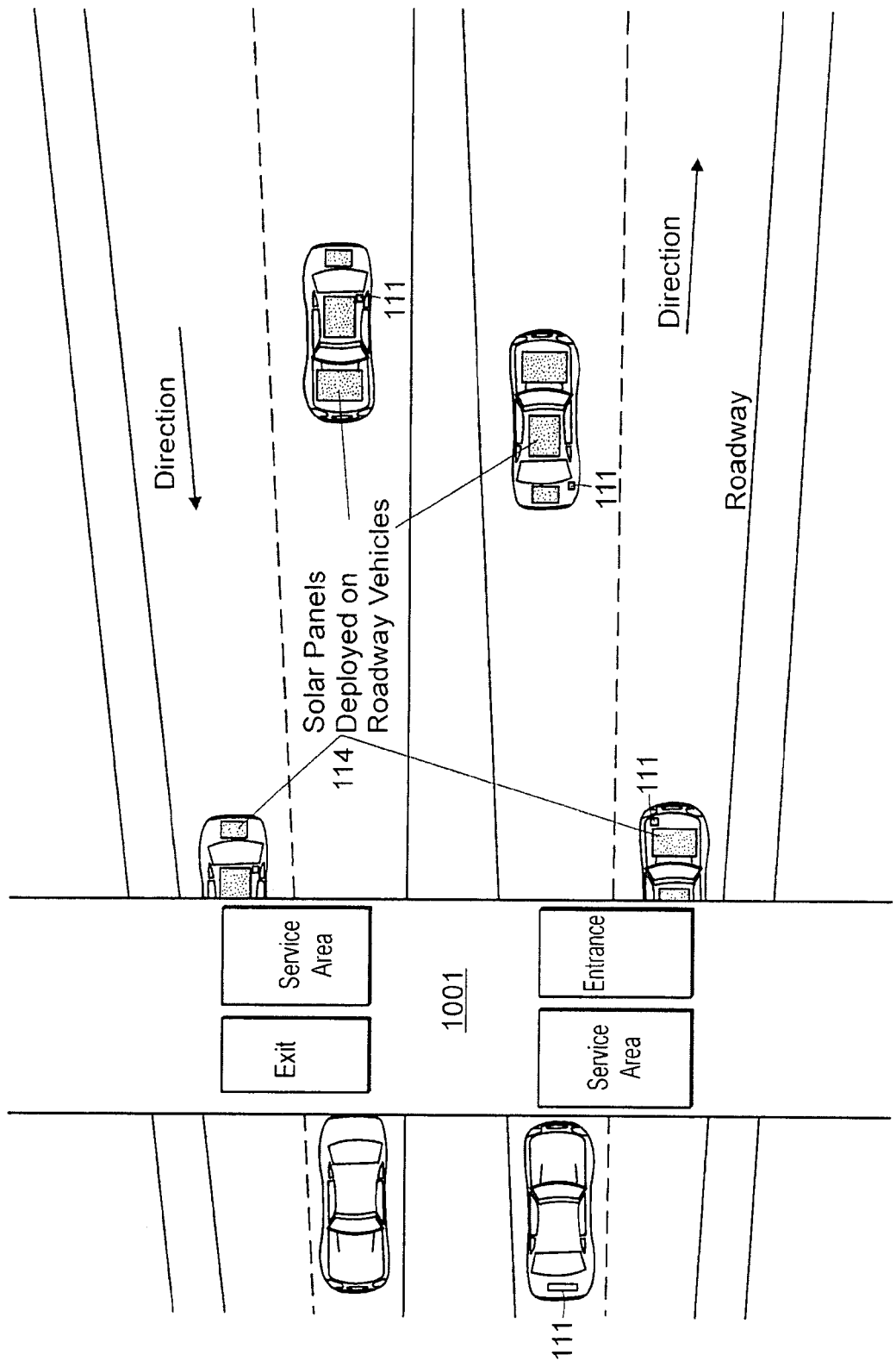
FIG. 24 illustrates an overhead view of vehicles with solar installation sheets traveling down the roadway.

FIG. 24 illustrates an overhead view of vehicles with solar installation sheets (Item 114) traveling down a road along with the integration of a service area (Item 1001) in a familiar toll plaza along the roadway route. Similar to the wind installation system, the solar installation sheets may be coupled to a battery outside or inside the vehicle. (Item 111).

Figure 25:
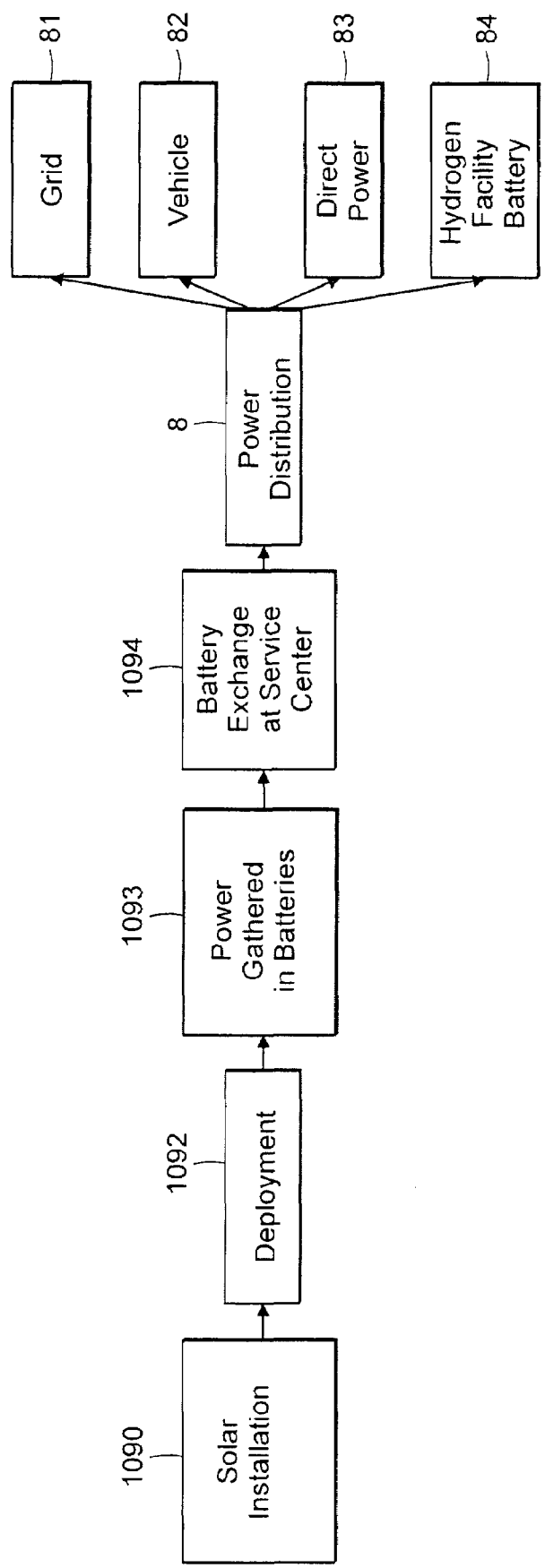
FIG. 25 illustrates a flow chart where the solar installation sheets and battery configuration are installed in the vehicle.

FIG. 25 illustrates a flow chart where one or more solar installation sheets and battery configuration are installed in a vehicle (Item 1095). The vehicle is deployed, registered within the system with the installation sheets installed (Item 1092) and activated to capture and store energy in the batteries (Item 1093). Power is then gathered in the batteries and stored as electricity (Item 1094) for power distribution (Item 8). The batteries then feed the instant vehicle with power that is metered or the batteries are exchanged at a service center (1094) and the power gathered in the batteries is used feed power into the grid (Item 81) after being sent through an inverter which brings the power into the proper technical condition for the grid according to specifications provided by the grid operator, or to power another vehicle (Item 82), direct power a business or home (Item 83) or to have the energy stored in a reserve power form such as batteries or via a manufacture and storage of hydrogen by using the extra power to fuel the electrolysis of water to create hydrogen (Item 84).

Figure 26:
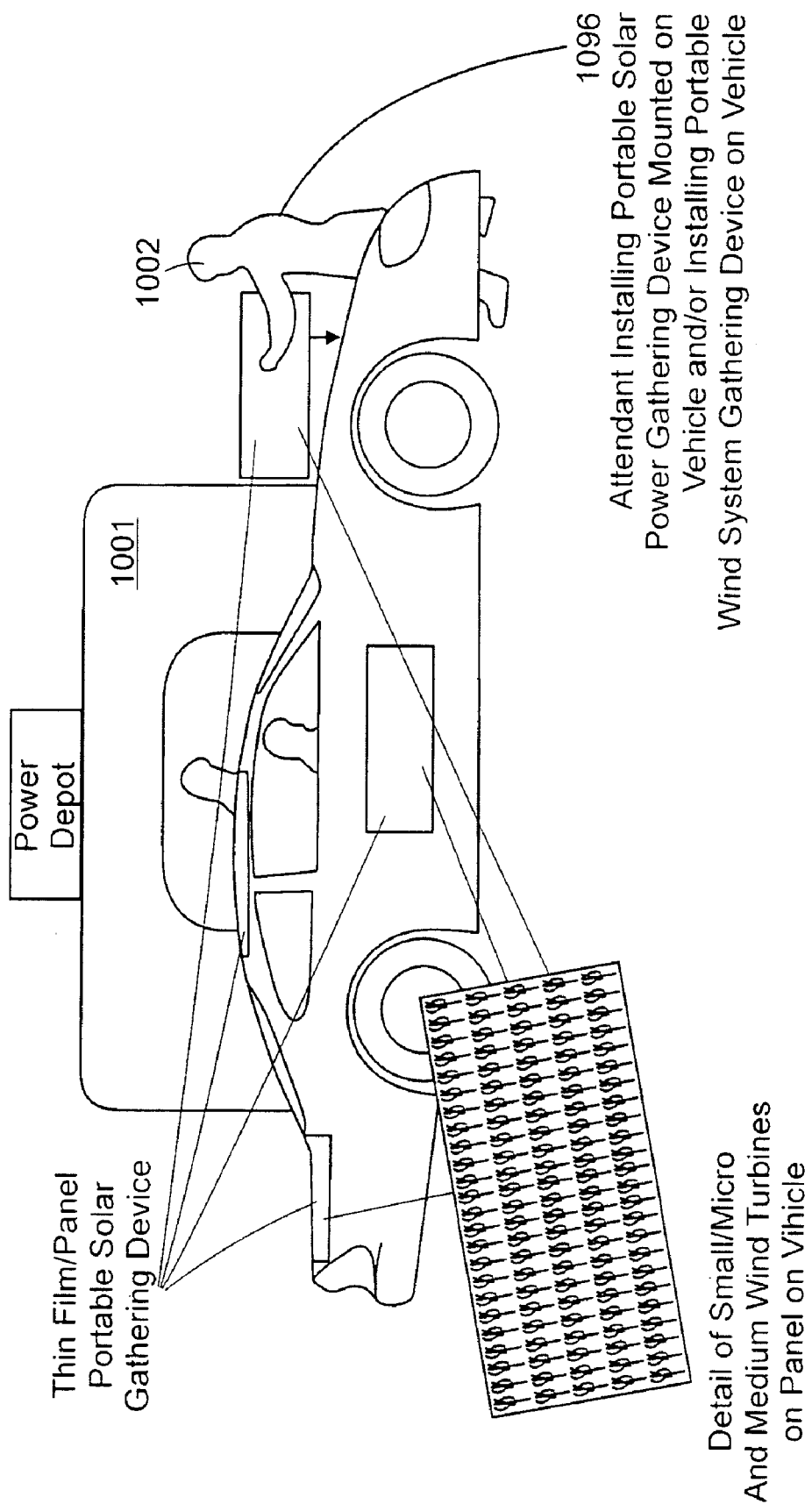
FIG. 26 illustrates portable solar and wind installation sheets being used in tandem separately and as unified, single sheets gathering both wind and solar energy simultaneously.

FIG. 26 illustrates portable solar and wind installation sheets being installed (1096) in tandem separately and as unified, single sheets gathering both wind and solar energy simultaneously. The installation, acquisition and customer service station centers (Item 1001) function identically as in the previous Figures. The surfaces of the turbine sheets including the turbines themselves may be sprayed with spray on power cells to maximize the potential of simultaneous solar and wind energy gathering from the same installation panel. Alternatively the solar material may be non-silicon film or standard silicon panelized structure. Wiring on the installation sheets may be dual in nature with solar energy going into specific batteries and wind energy into its own batteries or the energy may be put into the same batteries. Solar energy may also be used to power the wind turbines, thus creating only wind energy that is being used to charge the battery or battery array.

Figure 27:
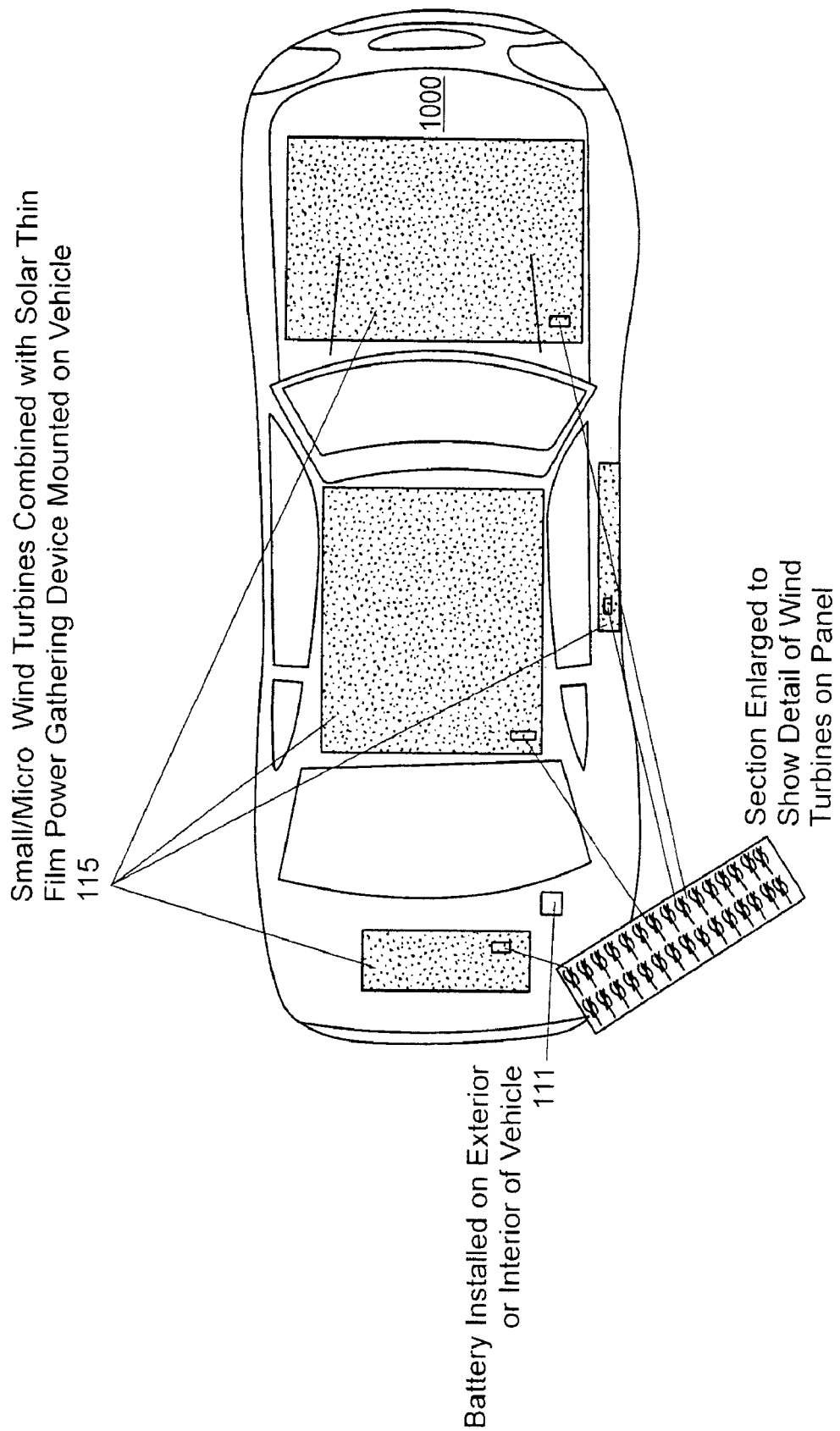
FIG. 27 illustrates an overhead view of a vehicle installed with the solar and wind integrated panels.

FIG. 27 illustrates an overhead view of a vehicle installed with the solar and wind integrated panels (Item 115). These panels may incorporate both solar and wind gathering systems in a single installation sheet or separately with wind alone installation sheets and solar alone installation sheets functioning and simultaneously deployed on a vehicle (Item 1000) participating in the system. The composite illustration of the installation sheet once again demonstrates tiny helix designed turbines, too small to be legibly seen without composite form drawing deployed on the vehicle with attendant solar gathering materials incorporated within the surface of the same installation sheets. Energy gathered by the sheets is transferred to the battery array (Item 111).

Figure 28:
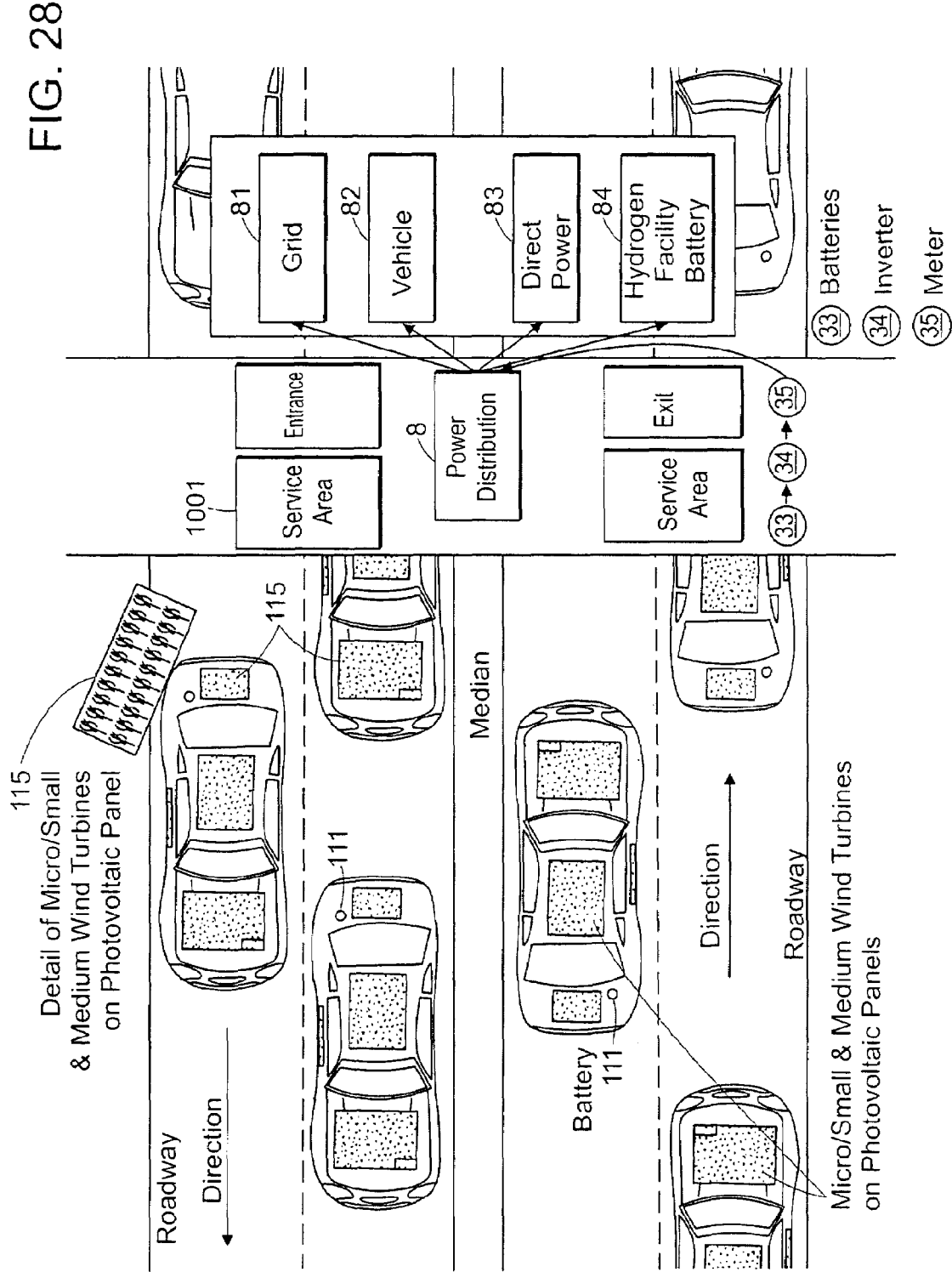
FIG. 28 illustrates an overhead view of vehicles deployed with solar and wind installation sheets moving in and out of service center areas for the installation, registration, updating and maintenance of said systems.

FIG. 28 illustrates an overhead view vehicles deployed with solar and wind installation sheets (Item 115) moving in and out of service center areas (Item 1001) for the installation, registration, updating and maintenance of the solar and wind energy generating devices. System installation sheets are displayed deployed on vehicles and composite diagrams give a feel for the large amount of tiny wind turbines that can be deployed on a single vehicle installation sheet. As charged batteries (Item 111) are collected at the service center (Item 1001) power is distributed using inverters and meters to store, condition, transmit and track power distributed from the system for direct use in vehicles (Item 82), for use in the utility grid (Item 81), for use in 3rd party vehicles (Item 82), which may pick up charged batteries as they pass through the service center, for direct powering of homes and businesses (Item 83) and for storage as reserve battery power or utilizing the battery energy to conduct the electrolysis of hydrogen for use in hydrogen powered systems as well as for storage of reserve energy (Item 84).

Figure 29:
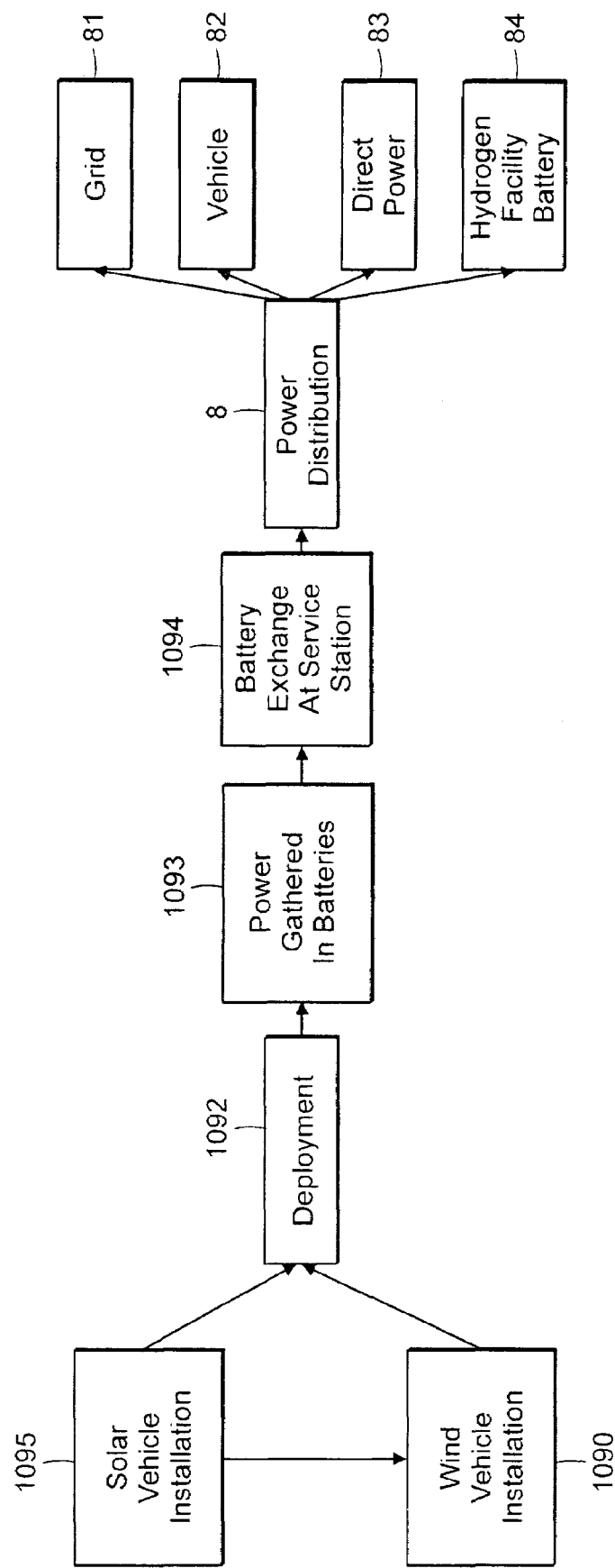
FIG. 29 illustrates a flow chart that combines the flow of energy generated by both wind and solar installation sheets.

FIG. 29 illustrates a flow chart that combines the flow of energy generated by both wind (Item 1090) and solar installation sheets (Item 1095) into the portable vehicle system (Item 1092), or solar energy may be used to power the wind energy installation and create a uniform, wind energy only, power source flowing into the battery or battery array (Item 1093). The vehicle is deployed (Item 1092), registered within the system with the installation sheets installed and activated to capture and store energy in the batteries (Item 1093). Power is then gathered in the batteries and stored as electricity. The batteries then feed the instant vehicle with power that is metered or the batteries are exchanged at a service center (Item 1094) and the power gathered in the batteries is distributed (Item 8) to be used feed power into the grid (Item 81) after being sent through an inverter which brings the power into the proper technical condition for the grid according to specifications provided by the grid operator, or to power another vehicle (Item 82), direct power a business or home (Item 83) or to have the energy stored in a reserve power form such as batteries or via a manufacture and storage of hydrogen by using the extra battery power to fuel the electrolysis of water to create hydrogen, which may be stored compressed and utilized for hydrogen engines or converted back to electricity using hydrogen fuel cell technology and distributed to third parties at times when peak energy needs create premium pricing demand (Item 84).

Figure 30:
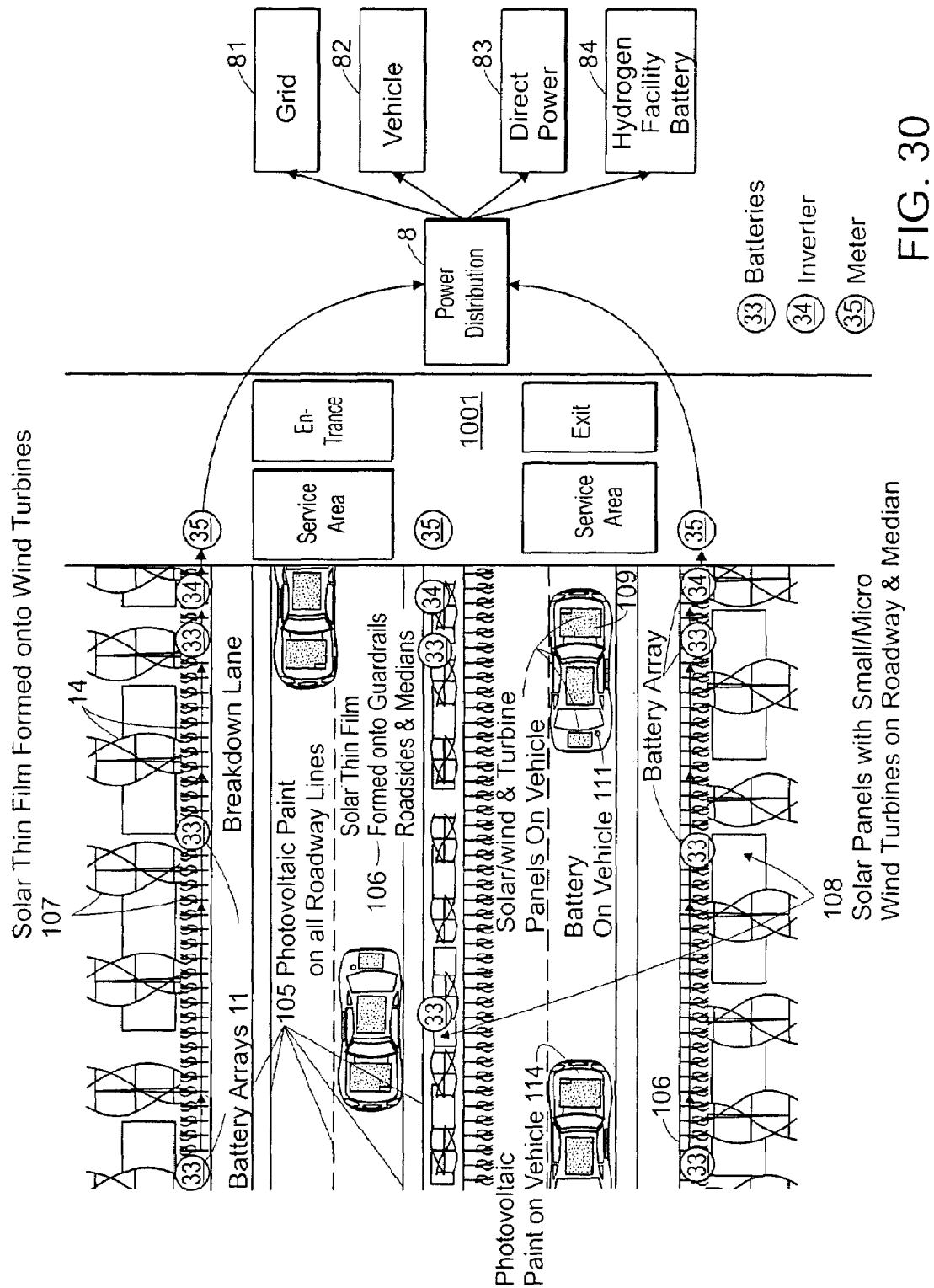
FIG. 30 illustrates a full integration of the fixed & portable roadway integrated wind and solar energy gathering roadway system.

FIG. 30 illustrates an integration of the fixed & portable roadway integrated wind and solar energy gathering roadway system. Ground and vehicle-based wind energy generating devices of different type along with ground and vehicle-based solar energy generating devices of different type are shown schematically (e.g., solar thin film formed on wind turbine generators of different size (Item 107), photovoltaic paint on roadway lines (Item 105), solar thin film formed onto roadside and median guardrails (Item 106), photovoltaic paint on vehicles (Item 114), solar/wind turbine generator panels/installation sheets on vehicles (Item 109), solar panels with small/micor wind turbines on roadway median and edge of breakdown lane. Power gathered from these various energy generating devices is transferred to ground and vehicle based energy storage systems, for example, ground and vehicle-based batteries and battery arrays (Items 33 and 111) for storing. The batteries then feed the system with power that is metered (Item 35) or the batteries are exchanged at a service center (Item 1001) and the power gathered in the batteries (Item 111) is used feed power, either at a service center (Item 1001) or along a convenient roadway location into a utility grid (Item 81) after being sent through an inverter (Item 35) which brings the power into the proper technical condition for the grid according to specifications provided by the grid operator, or to power another vehicle (Item 82), direct power a business or home (Item 83) or to have the energy stored in a reserve power form such as batteries or via a manufacture and storage of hydrogen by using the extra battery power to fuel the electrolysis of water to create hydrogen, which may be stored compressed and utilized for hydrogen engines or converted back to electricity using hydrogen fuel cell technology and distributed to third parties at times when peak energy needs create premium pricing demand (Item 84). This integrated 4 pronged approach creates a comprehensive clean energy power gathering system that may be deployed throughout entire roadway and highway systems converting the massive available space and energy available to conversion into a stable clean energy source with efficient geographical infrastructure for distribution.

Figure 31:
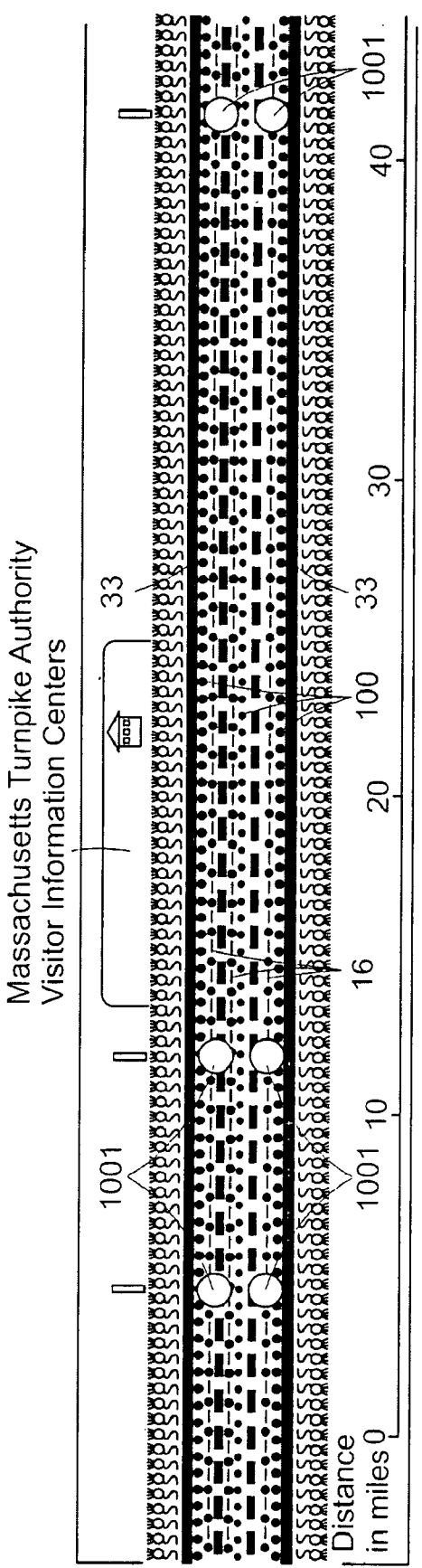
FIG. 31 illustrates the implementation of a roadway system across the entirety of a major roadway for the example of the Massachusetts Turnpike.
Figure 32:
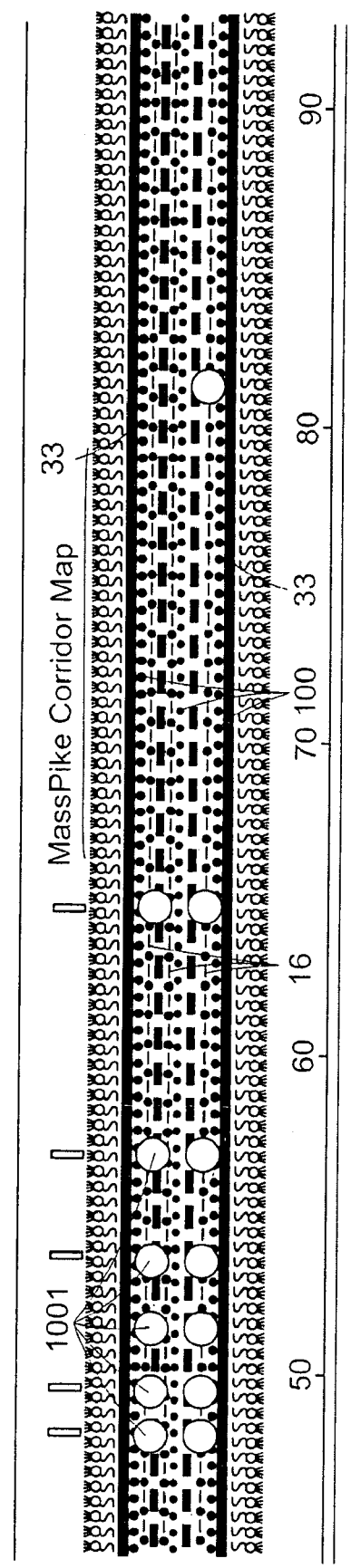
FIG. 32 illustrates the implementation of a roadway system across the entirety of a major roadway for the example of the Massachusetts Turnpike.
Figure 33:
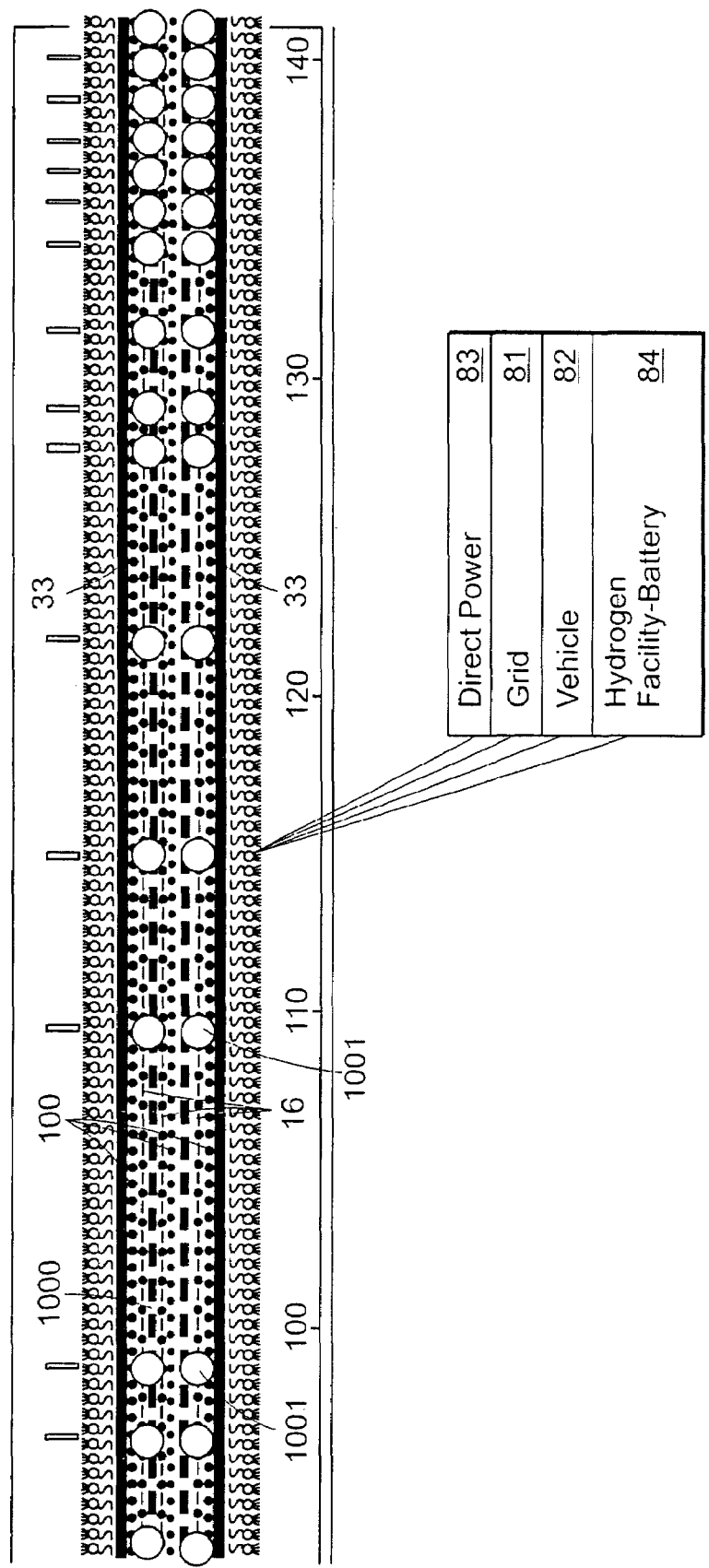
FIG. 33 illustrates the implementation of a roadway system across the entirety of a major roadway for the example of the Massachusetts Turnpike.
Figure 34:
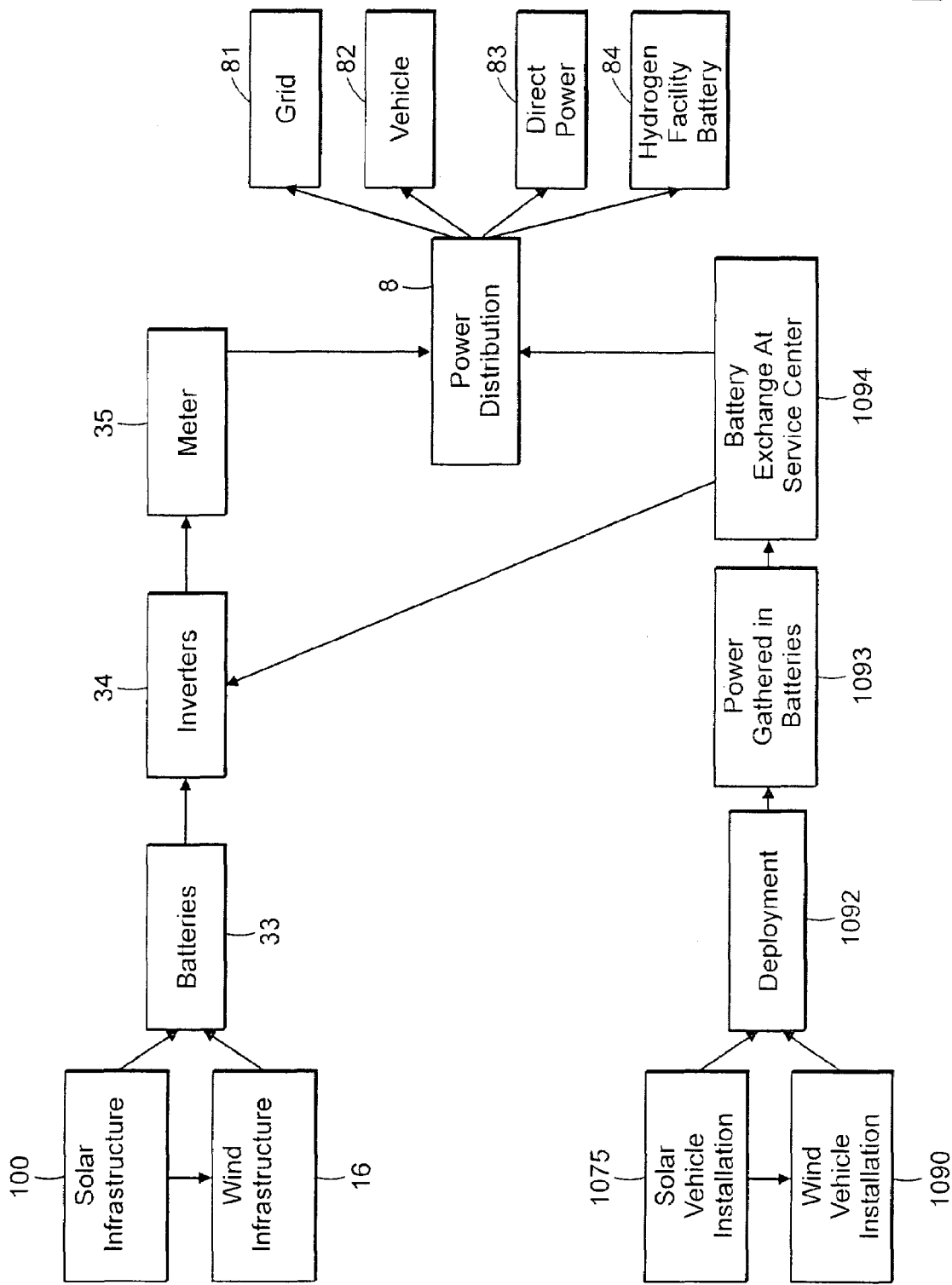
FIG. 34 illustrates the flow chart of the full integration of the wind and solar energy gathering roadway system.

FIGS. 31 to 33 illustrate the implementation of the system across the entirety of a major roadway, herein being the Massachusetts Turnpike. In each of these Figures, a service area is shown as a white circle (Item 1001). Battery arrays which although represented in the Figure in a contiguous manner due to spacing issues are actually (i.e., in the roadway system) spaced apart in implementation and are represented as solid black areas (Item 33). Roadway fixed solar and wind systems, in which the technologies may be utilized within the same implementation sheet, panel or turbine or utilized as separate technologies with wind turbine generators shown as dash-dotted areas (Item 16) and solar arrays shown as dotted areas (Item 100) and roadway lanes shown as dashed areas. FIGS. 31 and 32 show the first about 90 miles of the Massachusetts Turnpike. FIG. 33 represents the distribution of gathered power fed through the inverters and registered in meters to the various end distribution points including direct powering of businesses (Item 83), powering being sold back to the grid system (Item 80), power being utilized by vehicles (Item 82) or stored as excess generated energy in the form of auxiliary battery arrays or via the conversion to hydrogen by electrolysis and the subsequent storage of compressed hydrogen in tanks to be sold back to the utility at times of peak need or value (Item 84). Vehicles outfitted with portable solar and wind gathering systems contemplated by this system would travel along this roadway and utilize the service areas and toll booths to install, maintain and in some cases receive credit for energy gathered by the system installed upon the vehicle (Item 1000).

FIG. 32 illustrates the flow chart of a full integration of the wind and solar energy gathering roadway system. This flow chart features both solar and wind gathering fixed and portable systems (Items 100, 16, 1095 and 1090) integrated into the flow chart with the portable vehicle system flow of energy generated by both wind and solar installation sheets into the portable vehicle system, or solar energy may be used to power the wind energy installation and create a uniform, wind energy only, power source flowing into the battery or battery array (Items 34 and 1093). The one or more vehicles are deployed (Item 1092), registered within the system with the installation sheets installed and activated to capture and store energy in the batteries (Item 1093). Power is then gathered in the batteries and stored as electricity. The batteries then feed the instant vehicle with power that is metered or the batteries (Item 1093) are exchanged at a service center (Item 1094) and the power gathered in the batteries is used to feed power into the grid after being sent through an inverter which brings the power into the proper technical condition for the grid (Item 81) according to specifications provided by the grid operator, or to power another vehicle (Item 9), direct power a business or home (Item 83) or to have the energy stored in a reserve power form such as batteries or via a manufacture and storage of hydrogen by using the extra battery power to fuel the electrolysis of water to create hydrogen, which may be stored compressed and utilized for hydrogen engines or converted back to electricity using hydrogen fuel cell technology and distributed to third parties at times when peak energy needs create premium pricing demand (Item 84). The fixed wind and solar roadway systems illustrates a flow chart where both wind and solar energy gathering devices as described in FIG. 14/15 transfer their energy to batteries (Item 33) then to inverters (Item 34) then registering the amount of energy via the meters (Item 35) before being distributed to the utility grid (Item 81), vehicles (Item 82), direct distribution of homes (Item 83) and businesses or utilized as stored energy via large battery arrays or via conversion to hydrogen to be held in compressed tanks via the creation of hydrogen via electrolysis (Item 84).

While this invention has been particularly shown and described with references to example embodiments thereof, it will be understood by those skilled in the art that various changes in form and details may be made therein without departing from the scope of the invention encompassed by the appended claims.

What is claimed is:

1. A roadway system for energy generation and distribution, comprising:
   a plurality of ground-based wind energy generating devices;
   a plurality of roads; and
   a roadway system electricity grid electrically connected to a utility grid and configured to distribute electricity to direct power loads and the utility grid;
   wherein the ground-based wind energy generating devices are electrically connected to the roadway system electricity grid and positioned effectively near the roads to thereby allow energy generation from wind created from passing vehicles in addition to energy generation from atmospheric wind.

2. The roadway system of claim 1, wherein the ground-based wind energy generating devices, independently, are positioned on the roads or within 40 feet from the roads.

3. The roadway system of claim 1, wherein the ground-based wind energy generating devices, independently, are positioned on the roads or within 25 feet from the roads.

4. The roadway system of claim 1, wherein the ground-based wind energy generating devices, independently, are positioned on the roads or within 10 feet from the roads.

5. The roadway system of claim 1, wherein at least 90% of the ground-based wind energy generating devices is positioned on the roads or within 25 feet from the roads.

6. The roadway system of claim 1, wherein at least 90% of the ground-based wind energy generating devices is positioned on the roads or within 10 feet from the roads.

7. The roadway system of claim 1, wherein the roads comprise a median, and a ground-based wind energy generating device is positioned on a median.

8. The roadway system of claim 7, wherein between 0% and 100% (by number) of the plurality of ground-based wind energy generating devices are positioned on medians.

9. The roadway system of claim 8, wherein between 20% and 80% (by number) of the plurality of ground-based wind energy generating devices are positioned on medians.

10. The roadway system of claim 1, wherein some of the plurality of ground-based wind energy generating devices are positioned in a stratum configuration.

11. The roadway system of claim 1, wherein the ground-based wind energy generating devices are positioned in a stratum configuration.

12. The roadway system of claim 1, wherein the ground-based wind energy generating devices, are positioned in a location selected from the group consisting of median and breakdown lane.

13. The roadway system of claim 1, further being characterized by an average distance between any two closest ground-based wind energy generating devices in the range between 5 micrometer and 200 meters.

14. The roadway system of claim 1, further being characterized by an average distance between any two closest ground-based wind energy generating devices in the range between 5 feet to 40 feet.

15. The roadway system of claim 1, wherein the ground-based wind energy generating devices are positioned along the roads with a density of at least 10 devices per mile of road.

16. The roadway system of claim 1, wherein the ground-based wind energy generating devices are positioned along the roads with a density of between 10 and one billion devices per mile of road.

17. The roadway system of claim 1, wherein at least 90% of the ground-based wind energy generating devices are equal to or less than 25 feet in height.

18. The roadway system of claim 1, wherein at least 90% of the ground-based wind energy generating devices are equal to or less than 10 feet in height.

19. The roadway system of claim 1, wherein the ground-based wind energy generating devices are equal to or less than 25 feet in height.

20. The roadway system of claim 1, wherein at least 90% of the ground-based wind energy generating devices comprises a vertical axis turbine.

21. The roadway system of claim 20, wherein the vertical axis turbine is a helix-style turbine.

22. The roadway system of claim 1, wherein said roads are any type of highway, turnpike, pike, toll road, state highway, freeway, clearway, expressway, parkway, causeway, throughway, interstate, speedway, autobahn, superhighway, street, roadway, railroad, train track, car race tack and airplane runway.

23. The roadway system of claim 1, wherein said roads are any type of highway, turnpike, pike, toll road, state highway, freeway, clearway, expressway, parkway, causeway, throughway, interstate, speedway, autobahn, superhighway, street, and roadway.

24. The roadway system of claim 1, further comprising a plurality of ground-based solar energy generating devices, wherein the ground-based solar energy generating devices are electrically connected to the roadway system electricity grid and positioned effectively near the roads.

25. The roadway system of claim 24, wherein the ground-based solar energy generating devices are positioned on the roads or within 40 feet from the roads.

26. The roadway system of claim 24 wherein the ground-based wind energy generating devices, optionally, comprise one or more solar energy generating devices.

27. The roadway system of claim 24, wherein the ground-based solar energy generating devices are positioned in a location selected from the group consisting of median, line divider, breakdown lane, guardrail, road light and road sign area.

28. The roadway system of claim 24, further comprising:
a service station along the roads; and
a vehicle, each comprising
a vehicle-based wind energy generating device; and
a vehicle-based energy storage system;
wherein for a given vehicle the respective vehicle-based wind energy generating device is electrically connected to the vehicle-based energy storage system of the given vehicle to thereby allow deposition of energy generated by the vehicle-based wind energy generating device into the vehicle-based energy storage system.

29. The roadway system of claim 28, wherein the ground-based wind energy generating device, optionally, comprises a solar energy generating device.

30. The roadway system of claim 28, wherein the vehicle-based energy storage system, optionally, is portable to thereby allow exchange of the vehicle-based energy storage system at the the service station.

31. The roadway system of claim 28, further comprising for a given vehicle, a vehicle-based solar energy generating device that is electrically connected to the vehicle-based energy storage system of the given vehicle to thereby allow deposition of energy generated by the respective vehicle-based solar energy generating device into the vehicle-based energy storage system.

32. The roadway system of claim 24, further comprising:
a service station along the roads; and
a vehicle, comprising
a vehicle-based solar energy generating device; and
a vehicle-based energy storage system;
wherein for a given vehicle the respective vehicle-based solar energy generating device is electrically connected to the vehicle-based energy storage system of the given vehicle to thereby allow deposition of energy generated by the vehicle-based solar energy generating device into the vehicle-based energy storage system.

33. The roadway system of claim 32, wherein the ground-based wind energy generating device, optionally, comprises a solar energy generating device.

34. The roadway system of claim 32, further comprising for a given vehicle, a vehicle-based wind energy generating device that is electrically connected to the vehicle-based energy storage system of the given vehicle to thereby allow deposition of energy generated by the respective vehicle-based wind energy generating device into the vehicle-based energy storage system.

35. The roadway system of claim 1, further comprising:
a service station along the roads; and
a vehicle, comprising
a vehicle-based wind energy generating device; and
a vehicle-based energy storage system;
wherein for a given vehicle the respective vehicle-based wind energy generating device is electrically connected to the vehicle-based energy storage system of the given vehicle to thereby allow deposition of energy generated by the vehicle-based wind energy generating device into the vehicle-based energy storage system.

36. The roadway system of claim 35, wherein the ground-based wind energy generating device, optionally, comprise a solar energy generating devices.

37. The roadway system of claim 35, wherein the vehicle-based energy storage system, optionally, is portable to thereby allow exchange of the vehicle-based energy storage system at the the service station.

38. The roadway system of claim 35, further comprising for a given vehicle, a vehicle-based solar energy generating device that is electrically connected to the vehicle-based energy storage system of the given vehicle to thereby allow deposition of energy generated by the respective vehicle-based solar energy generating device into the vehicle-based energy storage system.

39. The roadway system of claim 1, further comprising:
a service station along the roads; and
a vehicle, comprising
a vehicle-based solar energy generating device; and
a vehicle-based energy storage system;
wherein for a given vehicle the respective vehicle-based solar energy generating device is electrically connected to the vehicle-based energy storage system of the given vehicle to thereby allow deposition of energy generated by the vehicle-based solar energy generating device into the vehicle-based energy storage system.

40. The roadway system of claim 39, wherein the ground-based wind energy generating device, optionally, comprises a solar energy generating device.

41. The roadway system of claim 39, further comprising for a given vehicle, a vehicle-based wind energy generating device that is electrically connected to the vehicle-based energy storage system of the give vehicle to thereby allow deposition of energy generated by the respective vehicle-based wind energy generating device into the vehicle-based energy storage system.

42. The roadway system of claim 1, wherein the roadway system electricity grid further comprises means for storing energy generated by the roadway system.

43. The roadway system of claim 1, wherein the roadway system electricity grid further comprises means for inverting energy generated by the roadway system.

44. The roadway system of claim 1, wherein the roadway system electricity grid further comprises a single power source changing units.

45. The roadway system of claim 1, further comprising means for metering electricity.

46. The roadway system of claim 1, wherein the roadway system electricity grid further comprises one or more backup power systems.

* * * * *